United States Patent
Suzuki et al.

(10) Patent No.: US 9,106,781 B2
(45) Date of Patent: Aug. 11, 2015

(54) FUNCTION EXECUTING DEVICE WITH TWO TYPES OF INTERFACES FOR EXECUTING A COMMUNICATION WITH A TERMINAL DEVICE

(71) Applicants: Takanobu Suzuki, Nagoya (JP); Hirotaka Asakura, Nagoya (JP); Munehisa Matsuda, Nagoya (JP); Satoshi Tanaka, Nagoya (JP)

(72) Inventors: Takanobu Suzuki, Nagoya (JP); Hirotaka Asakura, Nagoya (JP); Munehisa Matsuda, Nagoya (JP); Satoshi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/834,423

(22) Filed: Mar. 15, 2013

(65) Prior Publication Data
US 2013/0258390 A1 Oct. 3, 2013

(30) Foreign Application Priority Data
Mar. 30, 2012 (JP) .................. 2012-082818

(51) Int. Cl.
*H04N 1/00* (2006.01)
*G06F 13/38* (2006.01)

(52) U.S. Cl.
CPC .......... *H04N 1/00912* (2013.01); *G06F 13/385* (2013.01); *G06F 2213/3814* (2013.01)

(58) Field of Classification Search
CPC ...................................... H04N 1/00
USPC ............................... 358/1.14–1.16
See application file for complete search history.

(56) References Cited

U.S. PATENT DOCUMENTS

| | | | |
|---|---|---|---|
| 2005/0088709 A1* | 4/2005 | Kizaki et al. | 358/501 |
| 2007/0230332 A1 | 10/2007 | Fukasawa | |
| 2008/0052710 A1* | 2/2008 | Iwai et al. | 718/100 |
| 2008/0084578 A1* | 4/2008 | Walker et al. | 358/1.15 |
| 2008/0222711 A1 | 9/2008 | Michaelis | |
| 2008/0231900 A1* | 9/2008 | Abe | 358/1.16 |

(Continued)

FOREIGN PATENT DOCUMENTS

| | | |
|---|---|---|
| CN | 101253469 A | 8/2008 |
| EP | 2645265 A2 | 10/2013 |

(Continued)

OTHER PUBLICATIONS

Wi-Fi Peer-to-Peer (P2P) Technical Specification Version 1.1, Wi-Fi Alliance 2010.
Co-pending U.S. Appl. No. 13/833,236, filed Mar. 15, 2013.
Extended European Search Report issued in European Patent Application No. 13161732.6 dated Jul. 23, 2013.
Anonymous, "Near Field Communication White Paper", Feb. 12, 2004, URL:http://www.ecma-international.org/activities/Communications/2004tg19-001.pdf [retrieved on Mar. 6, 2006].

(Continued)

*Primary Examiner* — Qian Yang
(74) *Attorney, Agent, or Firm* — Banner & Witcoff, Ltd.

(57) ABSTRACT

In a case where a first information including an execution request of a specific function via a first type of interface is received, a function executing device may execute a change process for changing an interface for communicating with a terminal device from the first type of interface to a second type of interface in a case where a state of the function executing device is determined as a non-error state. The function executing device may not execute the change process in a case where the state of the function executing device is determined as an error state. The specific function may include a communication process for communicating object data with the terminal device. The function executing device may execute the specific function including the communication process via the second type of interface in a case where the change process is being executed.

15 Claims, 11 Drawing Sheets

(56) References Cited

U.S. PATENT DOCUMENTS

| | | |
|---|---|---|
| 2009/0036056 A1 | 2/2009 | Oshima et al. |
| 2009/0066998 A1 | 3/2009 | Kato |
| 2009/0073482 A1* | 3/2009 | Tsuchiya ............... 358/1.14 |
| 2009/0103124 A1 | 4/2009 | Kimura et al. |
| 2010/0069008 A1 | 3/2010 | Oshima et al. |
| 2010/0188695 A1 | 7/2010 | Okigami |
| 2011/0028091 A1 | 2/2011 | Higgins et al. |
| 2011/0090830 A1* | 4/2011 | Churei ............... 370/311 |
| 2011/0177780 A1 | 7/2011 | Sato et al. |
| 2012/0034868 A1 | 2/2012 | Fine et al. |
| 2014/0038519 A1 | 2/2014 | Asakura |
| 2014/0063537 A1 | 3/2014 | Nishikawa et al. |

FOREIGN PATENT DOCUMENTS

| | | |
|---|---|---|
| JP | 2007-166538 A | 6/2007 |
| JP | 2009-037566 A | 2/2009 |
| JP | 2011-044092 A | 3/2011 |
| JP | 2011-146991 A | 7/2011 |
| JP | 2013-214139 A | 10/2013 |

OTHER PUBLICATIONS

European Search Report issued in corresponding European Application No. 13179289.7 mailed Jan. 17, 2014.

Smart Cards; UICC-CLF interface; Host Controller Interface P2P LNC Protocol, Vo. 1.0, Jan. 11, 2008, pp. 1-33.

Co-Pending U.S. Appl. No. 14/208,220, filed Mar. 13, 2014.

Non-Final Office Action received in corresponding U.S. Appl. No. 13/833,236 mailed May 9, 2014.

Oct. 27, 2014—(EP) Office Action—App 13 159 607.4.

Information Technology—Telecommunications and information exchange between systems—Near Field Communication Interface and Protocol -2 (NFCIP-2), ISO/IEC 21481, Second edition, Jul. 1, 2012.

Information Technology—Telecommunications and information exchange between systems—Near Field Communication—Interface and Protocol (NFCIP-1), ISO/IEC 18092, Second edition, Mar. 15, 2013.

Nosowitz, D., "Everything You Need to Know about Near Field Communication," Popular Science, posted Mar. 1, 2011.

Mar. 6, 2015—(CN) Notification of First Office Action—App 201310097370.7.

* cited by examiner

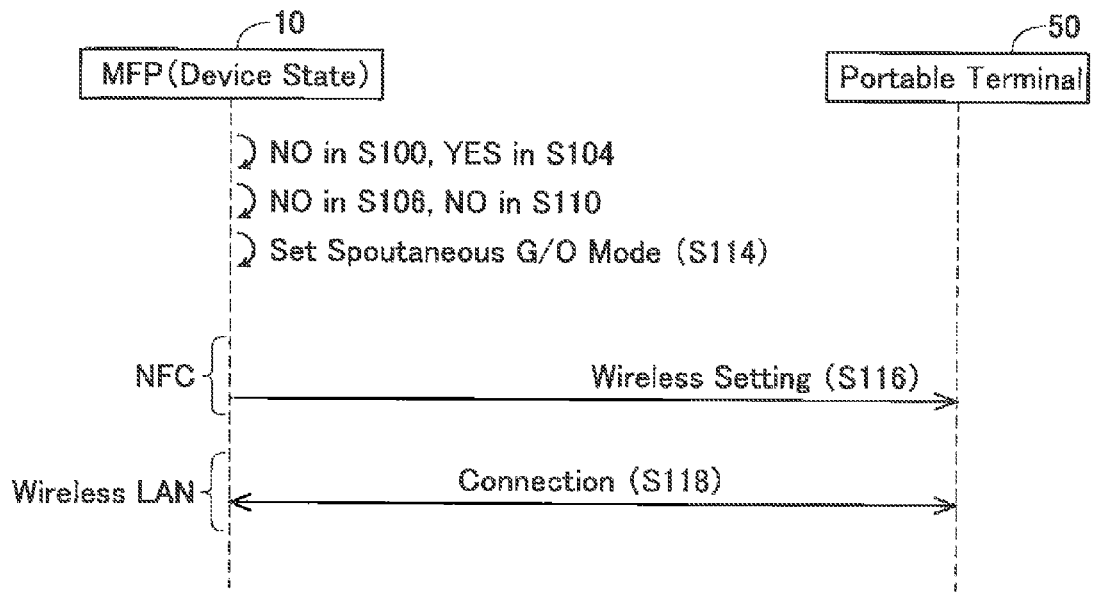
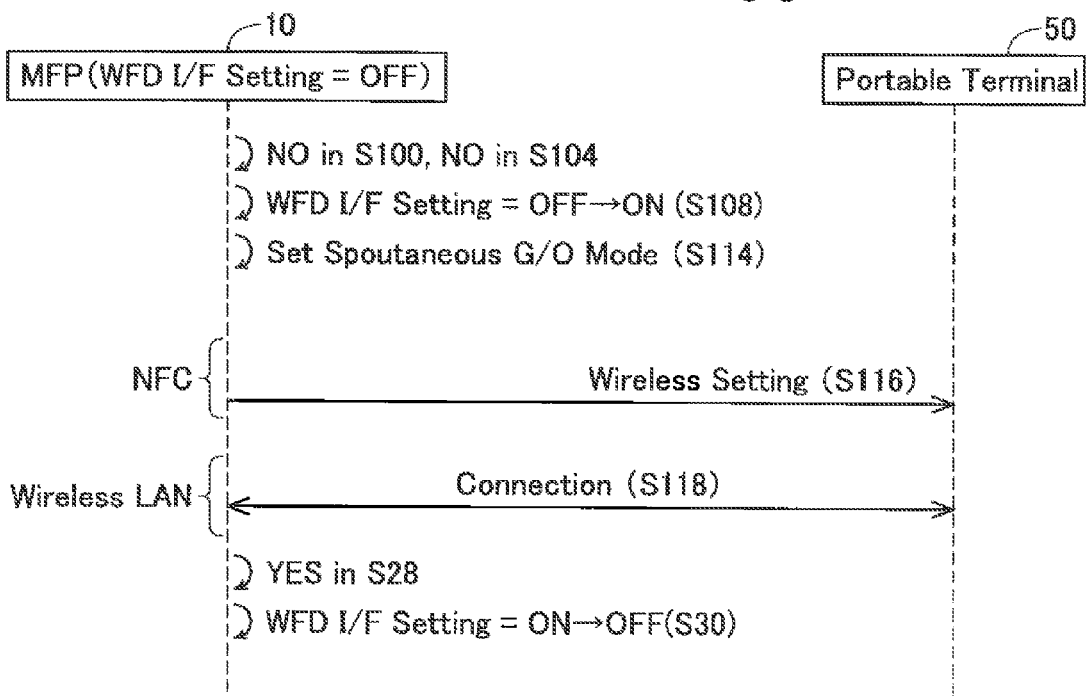

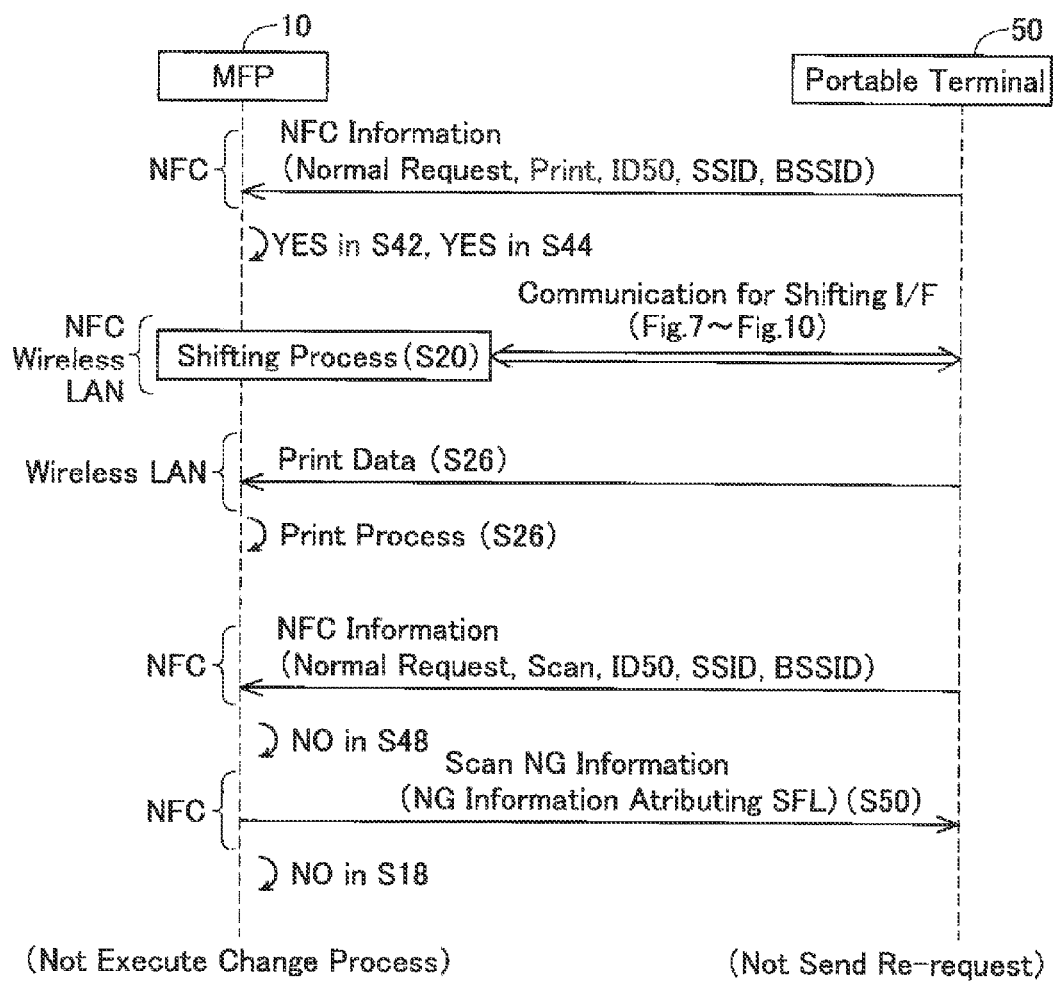

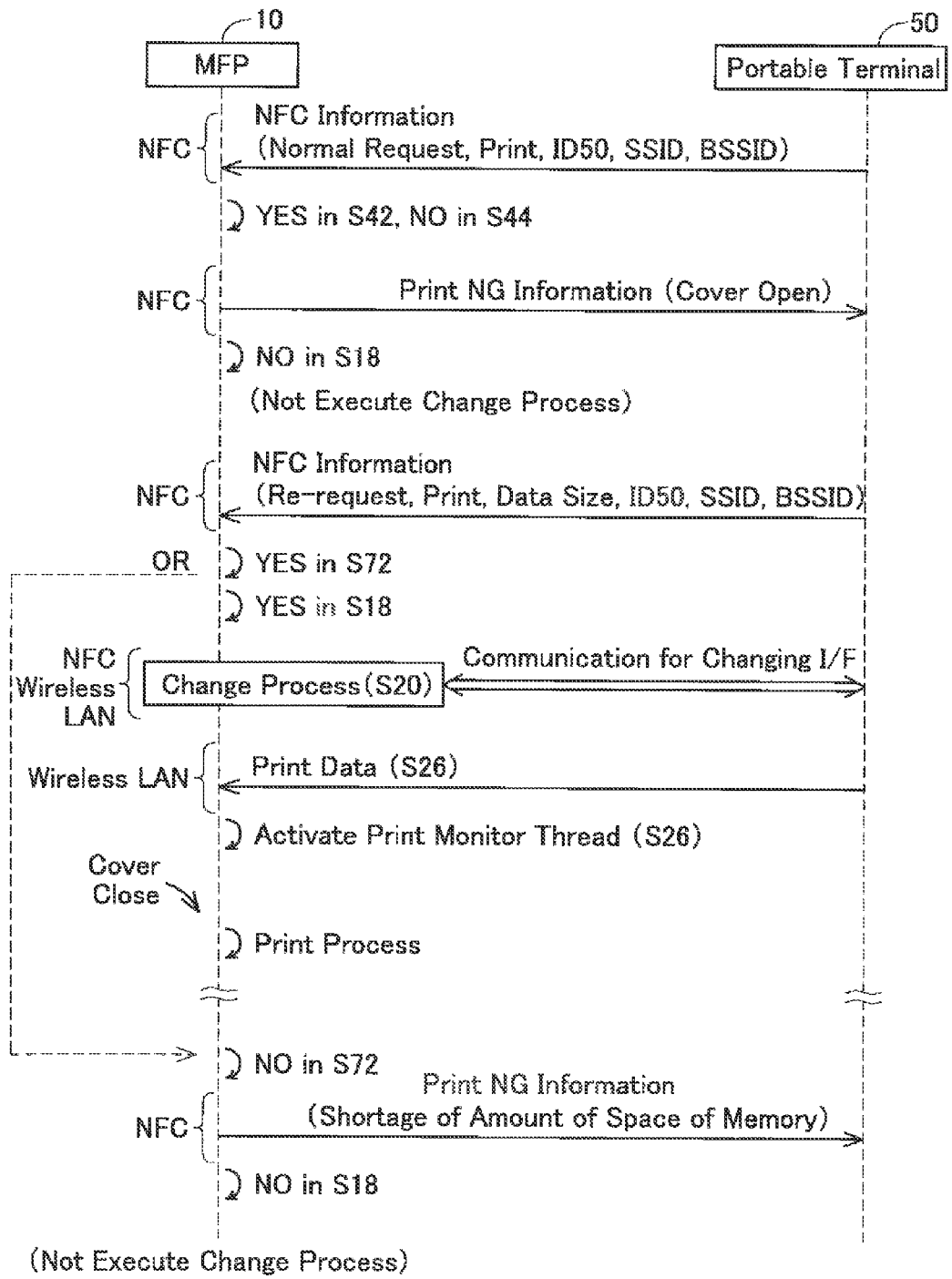

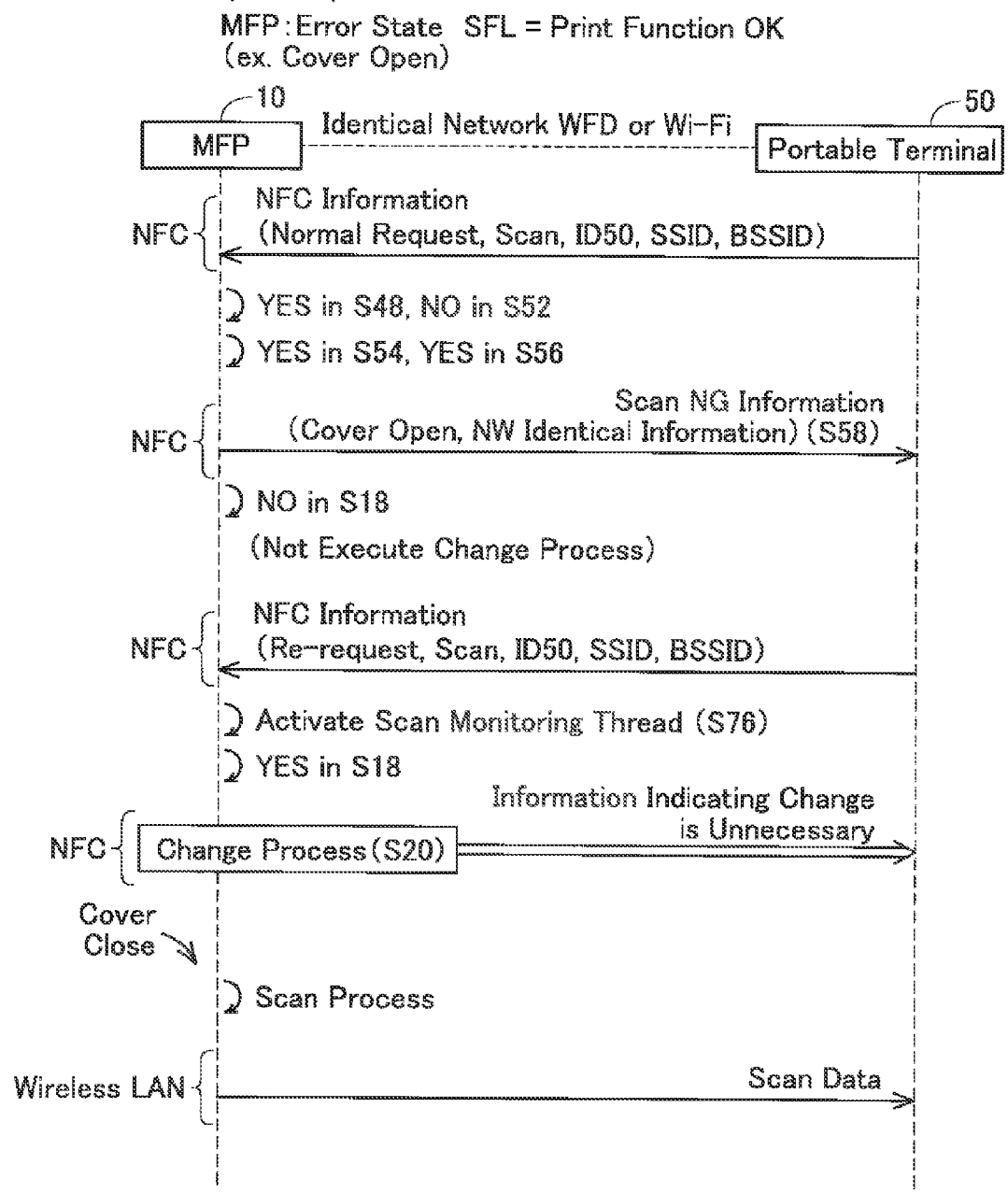

US 9,106,781 B2

FUNCTION EXECUTING DEVICE WITH TWO TYPES OF INTERFACES FOR EXECUTING A COMMUNICATION WITH A TERMINAL DEVICE

CROSS-REFERENCE TO RELATED APPLICATIONS

This application claims priority to Japanese Patent Application No. 2012-082818, filed on Mar. 30, 2012, the contents of which are hereby incorporated by reference into the present application.

TECHNICAL FIELD

A technique disclosed in the present specification relates to a function executing device.

DESCRIPTION OF RELATED ART

A a technique for two communication devices to execute wireless communication is known. The two communication devices execute communication of a wireless setting according to a short-range wireless communication system (i.e., a wireless communication according to NFC (abbreviation of: Near Field Communication)). The wireless setting is a setting for executing wireless communication according to a communication system different from the NFC system (e.g., IEEE 802.11a, 802.11b). Thereby, the two communication devices become capable of executing wireless communication according to the wireless setting.

SUMMARY

The present specification presents a function executing device capable of executing an appropriate operation.

The technique disclosed in the specification is a function executing device. The function executing device may comprise a first type of interface for executing a communication with a terminal device, a second type of interface for executing a communication with the terminal device. The function executing device may comprise one or more processors and a memory that stores computer-readable instructions therein. The computer-readable instructions, when executed by the one or more processors, may cause the function executing device to execute: (a) receiving first information including an execution request of a specific function via the first type of interface, the specific function including a communication process for communicating object data with the terminal device; (b) determining, in a case where the first information is received, whether a state of the function executing device is a non-error state in which the function executing device is capable of executing the specific function or an error state in which the function executing device is not capable of executing the specific function; (c) executing a change process for changing an interface for communicating with the terminal device from the first type of interface to the second type of interface in a case where the state of the function executing device is determined as the non-error state, and not executing the change process in a case where the state of the function executing device is determined as the error state; and (d) executing the specific function including the communication process via the second type of interface in a case where the change process is being executed.

The specification further discloses a function executing device capable of executing a plurality of functions including a first function and a second function. The function executing device may comprise a first type of interface for executing a communication with a terminal device and a second type of interface for executing a communication with the terminal device. The function executing device may comprise one or more processors and a memory that stores computer-readable instructions therein. The computer-readable instructions, when executed by the one or more processors, may cause the function executing device to execute: (h) storing, in a memory of the function executing device, permission information indicating, for each of the first function and the second function, whether or not the terminal device is capable of using the function; (i) receiving first information including an execution request of a specific function via the first type of interface, the specific function including a communication process for communicating object data with the terminal device; (j) determining whether or not the terminal device is capable of using the specific function using the permission information in the memory in a case where the first information is received; (k) executing a change process for changing an interface for communicating with the terminal device from the first type of interface to the second type of interface in a first case where it is determined that the specific function is the first function and the terminal device is capable of using the first function, and not executing the change process in a second case where it is determined that the specific function is the second function and the terminal device is not capable of using the second function; and (l) executing the specific function including the communication process via the second type of interface in a case where the change process is executed.

Moreover, a control method, a computer program, and a non-transitory computer-readable storage medium computer-readable instructions the function executing device, are also novel and useful. Further, a communication system including the function executing device and the terminal device are also novel and useful.

BRIEF DESCRIPTION OF THE DRAWINGS

FIG. 9 shows a sequence view of a case X3.
FIG. 10 shows a sequence view of a case X4.
FIG. 11 shows a sequence view of a case B.
FIG. 12 shows a sequence view of a case C.
and
FIG. 13 shows a sequence view of a case D.

EMBODIMENT (Configuration of Communication System)

Figure 1:
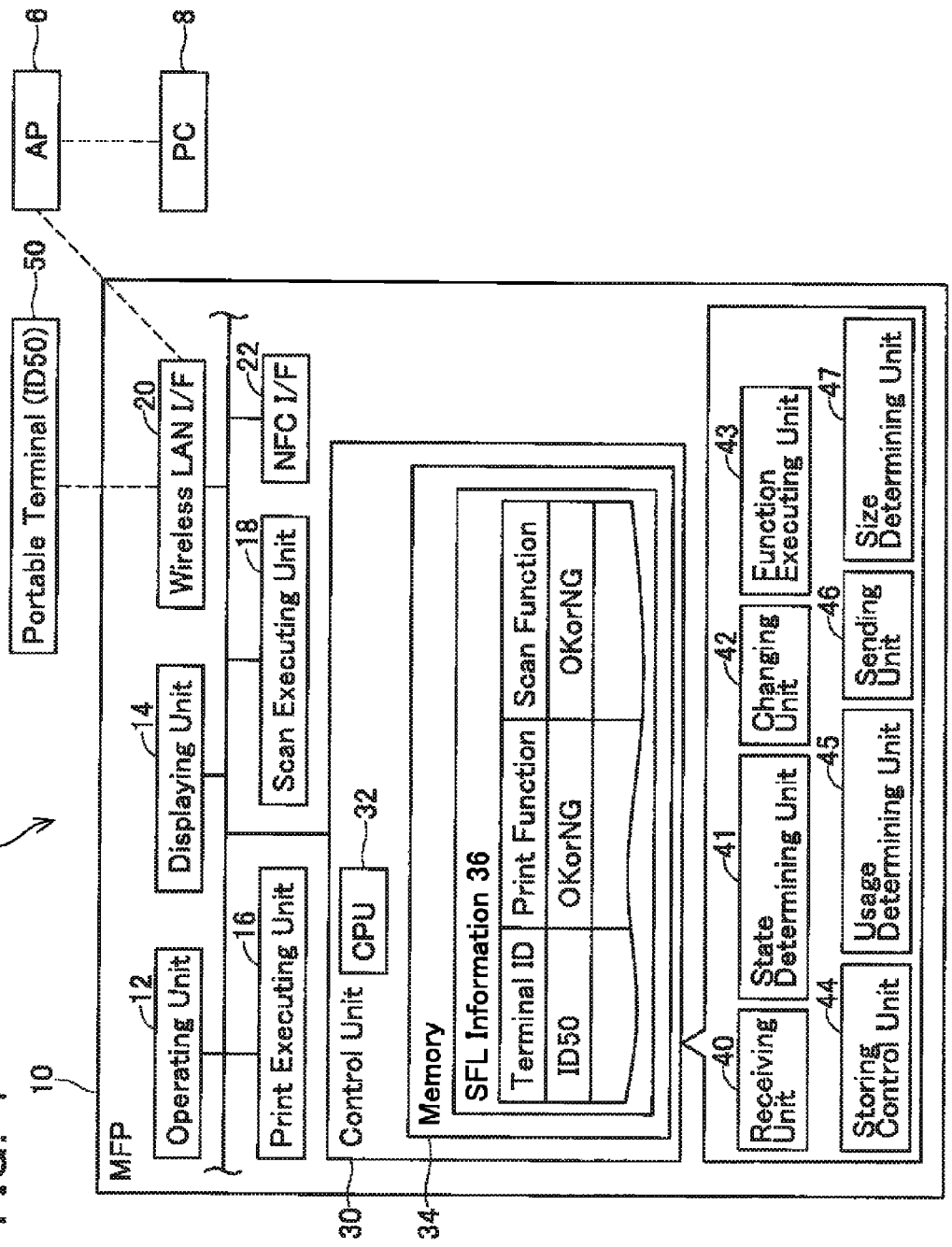
FIG. 1 shows the configuration of a communication system.

As shown in FIG. 1, a communication system 2 comprises a multi-function peripheral (called "MFP" (abbreviation of: Multi-Function Peripheral) below) 10, a portable terminal 50, an access point (called "AP" below) 6, and a PC 8. The MFP 10 and the portable terminal 50 are capable of executing short-range wireless communication. The short-range wireless communication is according to the wireless communication NFC system. In the present embodiment, the wireless communication is executed according to the NFC system based on international standards ISO/IEC 21481 or 18092.

Further, the PC 8, MFP 10, and the portable terminal 50 are each capable of executing wireless communication according to the Wi-Fi Direct system (to be described). Below, Wi-Fi Direct is called "WFD". In WFD, wireless communication is executed based on IEEE (abbreviation of: The Institute of Electrical and Electronics Engineers, Inc.) 802.11 standard and standards based on thereon (e.g., 802.11a, 11b, 11g, 11n, etc.). The NFC system and the system of WFD (called "WFD system" below) have different wireless communication systems (i.e., wireless communication standards). Further, the communication speed of wireless communication according to the WFD system is faster than the communication speed of wireless communication according to the NFC system.

For example, the MFP 10 can construct a WFD network by establishing a connection with the portable terminal 50 according to the WFD system (called "WFD connection" below). Similarly, the MFP 10 can construct a WFD network by establishing a WFD connection with the PC 8.

The PC 8, the MFP 10 and the portable terminal 50 are further capable of executing wireless communication according to a normal Wi-Fi system different from the WFD system. In general terms, wireless communication according to normal Wi-Fi is wireless communication using the AP 6, and wireless communication according to the WFD system is wireless communication not using the AP 6. For example, the MFP 10 can belong to a normal Wi-Fi network by establishing a connection with the AP 6 (called "normal Wi-Fi connection" below) according to normal Wi-Fi. Via the AP 6, the MFP 10 can execute wireless communication with another device belonging to the normal Wi-Fi network (e.g., the PC 8, the portable terminal 50). Moreover, the NFC system and the system of normal Wi-Fi (called "the normal Wi-Fi system" below) have different wireless communication systems (i.e., wireless communication standards). Further, the communication speed of normal Wi-Fi is faster than the communication speed of NFC.

(WFD)

WFD is a standard formulated by Wi-Fi Alliance. WFD is described in "Wi-Fi Peer-to-Peer (P2P) Technical Specification Version 1.1", created by Wi-Fi Alliance.

As described above, the PC 8, the MFP 10, and the portable terminal 50 are each capable of executing wireless communication according to the WFD system. Below, an apparatus capable of executing wireless communication according to the WFD system is called a "WFD-compatible apparatus". According to the WFD standard, three states are defined as the states of the WFD-compatible apparatus: Group Owner state (called "G/O state" below), client state, and device state. The WFD-compatible apparatus is capable of selectively operating in one state among the three states.

One WFD network includes an apparatus in the G/O state and an apparatus in the client state. Only one G/O state apparatus can be present in the WFD network, but one or more client state apparatuses can be present. The G/O state apparatus manages the one or more client state apparatuses. Specifically, the G/O state apparatus creates an administration list in which identification information (i.e., MAC address) of each of the one or more client state apparatuses is written. When a client state apparatus newly belongs to the WFD network, the G/O state apparatus adds the identification information of that apparatus to the administration list, and when the client state apparatus leaves the WFD network, the G/O state apparatus deletes the identification information of that apparatus from the administration list.

The G/O state apparatus is capable of wirelessly communicating object data (e.g., data that includes network layer information of the OSI reference model (print data, scan data, etc.)) with an apparatus registered in the administration list, i.e., with a client state apparatus (i.e., an apparatus belonging to the WFD network). However, with an unregistered apparatus which is not registered in the administration list, the G/O state apparatus is capable of wirelessly communicating data for the unregistered apparatus to participate in the WFD network (e.g., data that does not include network layer information (physical layer data such as a Probe Request signal, Probe Response signal, etc.)), but is not capable of wirelessly communicating the object data. For example, the MFP 10 that is in the G/O state is capable of wirelessly receiving print data from the portable terminal 50 that is registered in the administration list (i.e., the portable terminal 50 that is in the client state), but is not capable of wirelessly receiving print data from an apparatus that is not registered in the administration list.

Further, the G/O state apparatus is capable of relaying the wireless communication of object data (print data, scan data, etc.) between a plurality of client state apparatuses. For example, in a case where the portable terminal 50 that is in the client state is to wirelessly send print data to another printer that is in the client state, the portable terminal 50 first wirelessly sends the print data to the MFP 10 that is in the G/O state. In this case, the MFP 10 wirelessly receives the print data from the portable terminal 50, and wirelessly sends the print data to the other printer. That is, the G/O state apparatus is capable of executing the function of an AP of the normal wireless network.

Moreover, a WFD-compatible apparatus that does not belong to the WFD network (i.e., an apparatus not registered in the administration list) is a device state apparatus. The device state apparatus is capable of wirelessly communicating data for belonging to the WFD network (physical layer data such as a Probe Request signal, Probe Response signal, etc.), but is not capable of wirelessly communicating object data (print data, scan data, etc.) via the WFD network.

Moreover, below, an apparatus that is not capable of executing wireless communication according to the WFD system, but is capable of executing wireless communication according to normal Wi-Fi is called a "WFD-incompatible apparatus". The "WFD-incompatible apparatus" may also be called a "legacy apparatus". A WFD-incompatible apparatus cannot operate in the G/O state. A G/O state apparatus can register identification information of the WFD-incompatible apparatus in the administration list.

(Configuration of MFP 10)

The MFP 10 comprises an operating unit 12, a displaying unit 14, a print executing unit 16, a scan executing unit 18, a wireless LAN interface (an "interface" is described as "I/F" below) 20, an NFC I/F 22, and a control unit 30. The operating unit 12 includes a plurality of keys. A user can input various instructions to the MFP 10 by operating the operating unit 12. The displaying unit 14 is a display for displaying various types of information. The print executing unit 16 is an ink jet system, laser system, etc. printing mechanism. The scan executing unit 18 is a CCD, CIS, etc. scanning mechanism.

The wireless LAN I/F 20 is an interface for the control unit 30 to execute wireless communication according to the WFD system and wireless communication according to normal Wi-Fi. The wireless LAN I/F 20 is physically one interface. However, a MAC address used in wireless communication according to the WFD system (called "MAC address for WFD" below) and a MAC address used in wireless communication according to normal Wi-Fi (called "MAC address for normal Wi-Fi" below) are both assigned to the wireless LAN I/F 20. More specifically, the MAC address for the normal Wi-Fi is pre-assigned to the wireless LAN I/F 20. Using the MAC address for the normal Wi-Fi, the control unit 30 creates the MAC address for WFD, and assigns the MAC address for WFD to the wireless LAN I/F 20. The MAC address for WFD differs from the MAC address for the normal Wi-Fi. Consequently, via the wireless LAN I/F 20, the control unit 30 can simultaneously execute both wireless communication according to the WFD system and wireless communication according to the normal Wi-Fi. Consequently, a situation can be established in which the MFP 10 belongs to the WFD network and belongs to the normal Wi-Fi network. Moreover, in a variant, an interface for executing wireless communication according to the WFD system and an interface for executing wireless communication according to normal Wi-Fi may be configured by chips which are physically different.

Moreover, the G/O state apparatus can write, in the administration list, not only the identification information of the WFD-compatible apparatus that is in the client state, but also the identification information of a WFD-incompatible apparatus. That is, the G/O state apparatus can also establish the WFD connection with the WFD-incompatible apparatus. In general terms, the WFD connection is a wireless connection in which the MAC address for the WFD of the MFP 10 is used. Further, the WFD network is a wireless network in which the MAC address for the WFD of the MFP 10 is used. Similarly, the normal Wi-Fi connection is a wireless connection in which the MAC address for the normal Wi-Fi of the MFP 10 is used. Further, the normal Wi-Fi network is a wireless network in which the MAC address for the normal Wi-Fi of the MFP 10 is used.

Moreover, by operating the operating unit 12, the user can change the setting of the wireless LAN I/F 20 between a setting capable of executing the wireless communication in accordance with the WFD system (expressed as "WFD I/F setting is ON" below), and a setting not capable of executing the wireless communication in accordance with the WFD system (expressed as "WFD I/F setting is OFF" below). The control unit 30 stores a value (ON or OFF) indicating the WFD I/F setting set by the user in the memory 34.

The NFC I/F 22 is an interface for the control unit 30 to execute wireless communication according to the NFC system. The NFC I/F 22 is formed of a chip differing physically from the wireless LAN I/F 20.

Moreover, the communication speed of wireless communication via the wireless LAN I/F 20 (e.g., maximum communication speed is 11 to 454 Mbps) is faster than the communication speed of wireless communication via the NFC I/F 22 (e.g., maximum communication speed is 100 to 424 Kbps). Further, the frequency of the carrier wave in wireless communication via the wireless LAN I/F 20 (e.g., 2.4 GHz band, 5.0 GHz band) differs from the frequency of the carrier wave in the wireless communication via the NFC I/F 22 (e.g., 13.56 MHz band). Further, in a case where the distance between the MFP 10 and the portable terminal 50 is less than or equal to approximately 10 cm, the control unit 30 can wirelessly communicate with the portable terminal 50 according to the NFC system via the NFC I/F 22. In a case where the distance between the MFP 10 and the portable terminal 50 is either less than or equal to 10 cm, or is greater than or equal to 10 cm (e.g., a maximum is approximately 100 m), the control unit 30 can wirelessly communicate, via the wireless LAN I/F 20, with the portable terminal 50 according to the WFD system and according to the normal Wi-Fi. That is, the maximum distance across which the MFP 10 can execute wireless communication with a communication destination apparatus (e.g., the portable terminal 50) via the wireless LAN I/F 20 is greater than the maximum distance across which the MFP 10 can execute the wireless communication with the communication destination apparatus via the NFC I/F 22.

The control unit 30 comprises a CPU 32 and the memory 34. The CPU 32 executes various processes according to programs stored in the memory 34. The CPU 32 realizes the functions of the units 40 to 47 by executing processes according to the programs.

The memory 34 includes a ROM, RAM, hard disk, etc. The memory 34 stores the programs executed by the CPU 32. In the case where the MFP 10 currently belongs to a WFD network, the memory 34 stores information indicating that the MFP 10 currently belongs to the WFD network, and a wireless setting (including authentication method, encryption method, password, SSID (Service Set Identifier) and BSSID (Basic Service Set Identifier) of the wireless network) for communicating object data (e.g., print data, scan data) via the WFD network. Further, in the case where the MFP 10 currently belongs to a normal Wi-Fi network, the memory 34 stores information indicating that the MFP 10 currently belongs to the normal Wi-Fi network, and a wireless setting for communicating object data via the normal Wi-Fi network. Moreover, the SSID is an identifier for identifying the wireless network, and the BSSID is a unique identifier (e.g., MAC address) of the access point (i.e., the G/O state apparatus in the case of the WFD network) that constructs the wireless network.

The memory 34 further stores a value (ON or OFF) indicating the WFD I/F setting. Moreover, in a state where the WFD I/F setting is OFF within the memory 34, the control unit 30 cannot execute processes in accordance with the WFD system (e.g., a process of setting the MFP 10 to spontaneous G/O mode (to be described), G/O negotiation, etc.). In a state where the WFD I/F setting is ON, the memory 34 further stores a value indicating the current state of the MFP 10 relating to the WFD system (one state from among G/O state, client state, or device state).

Moreover, by operating the operating unit 12, the user can set the MFP 10 to spontaneous G/O mode. Spontaneous G/O mode is a mode for maintaining the operation of the MFP 10 in the G/O state. The memory 34 further stores a value indicating whether the MFP 10 has been set to spontaneous G/O mode. Moreover, when a WFD-compatible apparatus that is in the device state is to establish a WFD connection with another WFD-compatible apparatus that is in the device state, the WFD-compatible apparatus usually executes G/O negotiation to selectively determine which state, of G/O state and client state, it is to operate in. In the case where the MFP 10 has been set to the spontaneous G/O mode, the MFP 10 maintains operation in the G/O state without executing G/O negotiation.

The memory 34 further stores SFL (Secure Function Lock) information 36. The SFL information 36 includes, for each of a plurality of terminal devices including the portable terminal 50, ID-function information in which the following are associated: an ID of the terminal device (e.g. an ID 50), information (OK or NG) indicating whether the terminal device is capable of using the print function, and information (OK or NG) indicating whether the terminal device is capable of using the scan function. Moreover, the SFL information 36 further includes public information in which the following are associated: information indicating that the device is a public terminal device (i.e., a terminal device in which an ID is not registered in the ID-function information), information (NG) indicating that the terminal device is not capable of using the print function, and information (NG) indicating that the terminal device is not capable of using the scan function. By operating the operating unit 12, the user of the MFP 10 inputs the SFL information 36 to the MFP 10. Thereby, the storing control unit 44 stores, in the memory 34, the SFL information 36 input by the user.

(Configuration of Portable Terminal 50)

The portable terminal 50 is, for example, a mobile phone (e.g., a Smart Phone), PDA, notebook PC, tablet PC, portable music playback device, portable video playback device, etc. The portable terminal 50 comprises a wireless LAN I/F (i.e., an interface for WFD and normal Wi-Fi) and an NFC I/F. Consequently, the portable terminal 50 is capable of executing wireless communication with the MFP 10 by using a wireless LAN, and is capable of executing wireless communication with the MFP 10 by using the NFC I/F. The PC 8 comprises an application program for causing the MFP 10 to execute a function (e.g., print function, scan function, etc.). Moreover, the application program may, for example, be installed on the portable terminal 50 from a server provided by a vendor of the MFP 10, or may be installed on the portable terminal 50 from a media shipped together with the MFP 10.

(Configuration of PC 8)

The PC 8 comprises a wireless LAN I/F (i.e., an interface for WFD and normal Wi-Fi), but does not comprise an NFC I/F. Consequently, the PC 8 is capable of executing communication with the MFP 10 by using a wireless LAN, but is not capable of executing wireless communication according to the NFC system. The portable terminal 50 comprises a driver program for causing the MFP 10 to execute a function (e.g., print function, scan function, etc.). Moreover, the driver program is usually installed on the PC 8 from a media shipped together with the MFP 10. However, in a variant, the driver program may be installed on the PC 8 from a server provided by the vendor of the MFP 10.

(Configuration of AP 6)

The AP 6 is not a G/O state apparatus of the WFD system, but is a normal access point called a wireless access point or wireless LAN router. The AP 6 can establish a normal Wi-Fi connection with a plurality of apparatuses. Thereby, a normal Wi-Fi network including the AP 6 and the plurality of apparatuses is constructed. The AP 6 receives data from one apparatus from among the plurality of apparatuses belonging to the normal Wi-Fi network, and sends the data to another one apparatus from among the plurality of apparatuses. That is, the AP 6 relays communication between a pair of apparatuses belonging to the normal Wi-Fi network.

(Process Executed by MFP 10)

A process executed by the MFP 10 will be described with reference to FIG. 2. When a power source of the MFP 10 is turned ON, the control unit 30 executes the process of FIG. 2. While the power source of the MFP 10 is ON, the NFC I/F 22 assumes a state of detecting a device capable of executing wireless communication according to the NFC system.

The user of the portable terminal 50 activates the application program. Next, the user inputs, to the portable terminal 50, an instruction for causing the MFP 10 to execute a function (print function or scan function). In this case, the portable terminal 50 creates NFC information. As will be described in detail later, in the case where the portable terminal 50 receives NG information from the MFP 10 after having sent the NFC information to the MFP 10, the portable terminal 50 can re-create and send the NFC information. The NFC information of the first time includes at least information indicating a normal request, information indicating a function input by the user (print function or scan function), and the ID "ID 50" of the portable terminal 50. The NFC information of the second time includes, instead of the information indicating a normal request, information indicating a re-request. Further, the NFC information of the second time includes at least a function input by the user (print function or scan function), and the ID "ID 50" of the portable terminal 50. Moreover, in the case where the function input by the user is the print function (i.e., in the case where the NFC information of the second time includes information indicating the print function), the NFC information of the second time further includes size information indicating the data size of the print data.

Further, in the case where the portable terminal 50 currently belongs to a wireless network, the NFC information further includes the SSID and BSSID of the wireless network. Moreover, the case where the portable terminal 50 currently belongs to a wireless network is a case where a wireless connection, this being at least one of a WFD connection and a normal Wi-Fi connection, has been established between the portable terminal 50 and another device (e.g., the AP 6, the MFP 10).

The user of the portable terminal 50 can bring the portable terminal 50 closer to the MFP 10. Thereby, when the distance between the portable terminal 50 and the MFP 10 becomes less than the distance (e.g., 10 cm) in which the radio waves can be transmitted to each other, the NFC I/F 22 receives a detection wave from the MFP 10, and sends a response wave to the MFP 10. Then, the control unit 30 executes communication with the portable terminal 50, via the NFC I/F 22, to establish an NFC communication session between the MFP 10 and the portable terminal 50. When the NFC communication session has been established, the portable terminal 50 sends the created NFC information to the MFP 10.

In S10 the receiving unit 40 monitors whether NFC information is received from the portable terminal 50 via the NFC I/F 22. In the case where the NFC information is received (YES in S10), in S12 the receiving unit 40 analyzes the NFC information, and determines whether the NFC information includes information indicating a normal request, or includes information indicating a re-request. In the case of determining that the NFC information includes information indicating a normal request, the process proceeds to the normal request process of S14. In the case of determining that the NFC information includes information indicating a re-request, the process proceeds to the re-request process of S16.

Figure 3:
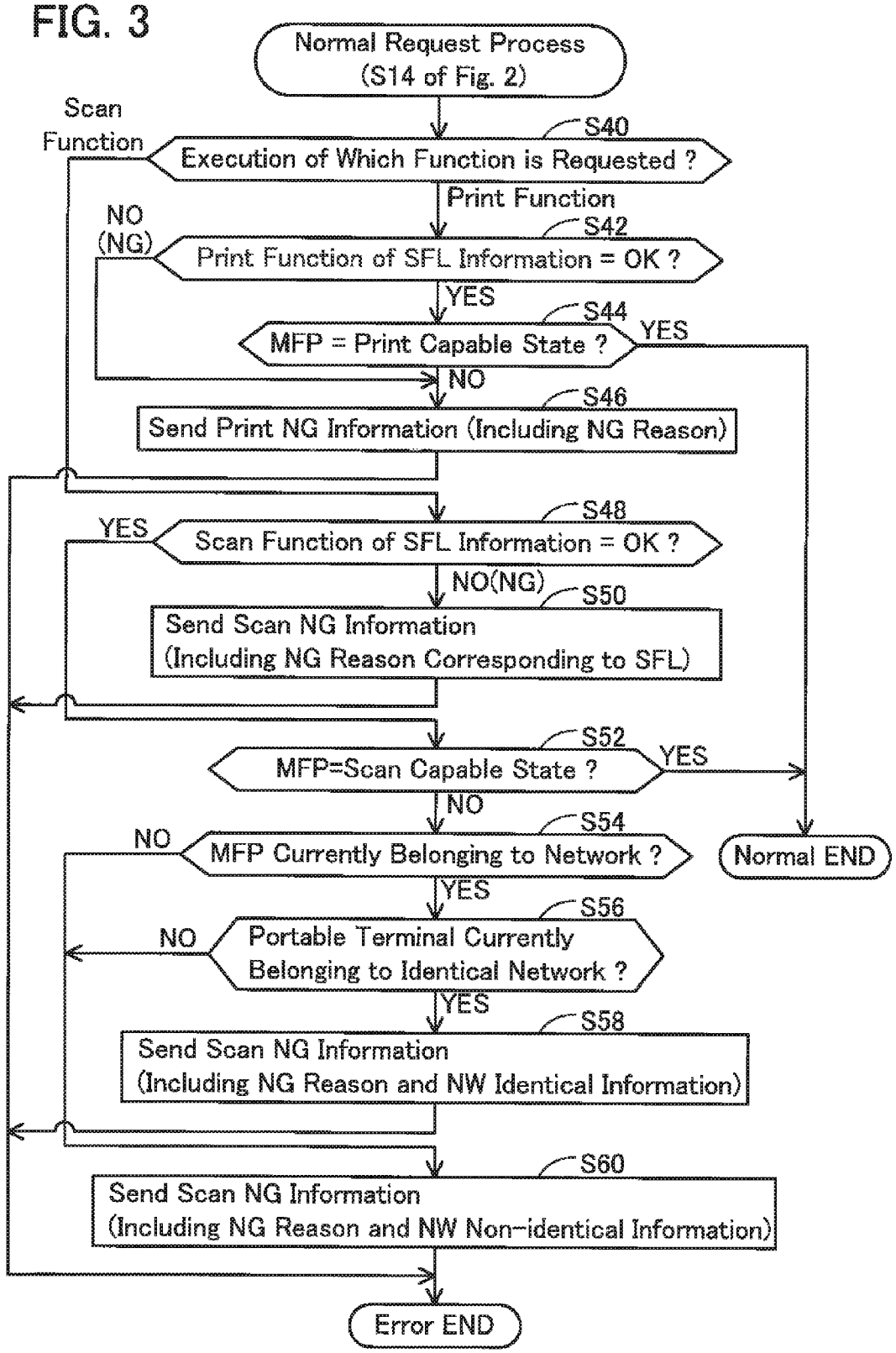
FIG. 3 shows a flowchart of a normal request process.

(Normal Request Process; FIG. 3)

The contents of the normal request process executed in S14 of FIG. 2 will be described with reference to FIG. 3. In S40 the control unit 30 analyzes the NFC information, and determines whether the NFC information includes information indicating the print function or includes information indicating the scan function. In the case of determining that the NFC information includes information indicating the print function, the process proceeds to S42. In the case of determining that the NFC information includes information indicating the scan function, the process proceeds to S48.

In S42 the usage determining unit 45 determines whether the portable terminal 50 is capable of using the print function. Specifically, the usage determining unit 45 first analyzes the NFC information, and identifies the terminal ID "ID 50" included in the NFC information. Next, the usage determining unit 45 refers to the ID-function information of the SFL information 36 within the memory 34, and determines whether the print function associated with the terminal ID "ID 50" is OK or NG. In the case where the print function is OK, the usage determining unit 45 determines YES in S42, and the process proceeds to S44. In the case where the print function is NG, the usage determining unit 45 determines NO in S42, and the process proceeds to S46. Moreover, in the case where the terminal ID "ID 50" is not registered in the ID-function information, the usage determining unit 45 refers to the public information of the SFL information 36 (print function=NG, scan function=NG), and determines NO in S42.

In S44 the state determining unit 41 determines whether the state of the MFP 10 is a print capable state (i.e., the non-error state) or a print incapable state (i.e., the error state). Specifically, the state determining unit 41 checks the remaining amount of an expendable item mounted on the print executing unit 16 and, in the case where the remaining amount of the expendable item is zero, determines that the state of the MFP 10 is the print incapable state (NO in S44). Moreover, e.g., in the case where the print executing unit 16 is an inkjet type printing mechanism, the expendable item is ink within an ink cartridge. Further, e.g., in the case where the print executing unit 16 is a laser type printing mechanism, the expendable item is toner within a toner cartridge.

Further, the state determining unit 41 checks the remaining amount of print medium to be used by the print executing unit 16 (i.e., the remaining amount of print medium in a paper feed tray) and, in the case where the remaining amount of print medium is zero, determines that the state of the MFP 10 is the print incapable state (NO in S44).

Next, the state determining unit 41 checks the state of hardware for executing the print function and, in a case where there is a problem in the hardware, determines that the state of the MFP 10 is the print incapable state (NO in S44). For example, in the case where the print medium is jammed in a transport mechanism of the print medium within the print executing unit 16 (i.e., the case of a paper jam), the state determining unit 41 determines that the state of the MFP 10 is the print incapable state. In this case, the hardware is the transport mechanism of the print medium within the print executing unit 16. Further, e.g., in a case where an amount of space within the memory 34 is extremely small, i.e., in the case where the amount of space within the memory 34 is less than a predetermined value, the print data cannot be processed, and consequently the state determining unit 41 determines that the state of the MFP 10 is the print incapable state. In this case, the hardware is the memory 34. Further, e.g., in the case where, from among a plurality of members constituting a housing of the MFP 10, a cover member that must remain closed during printing is open (called "cover open" below), the state determining unit 41 determines that the state of the MFP 10 is the print incapable state. In this case, the hardware is the cover member.

In the case where, due to a problem in any of the remaining amount of an expendable item, the remaining amount of print medium, or the state of the hardware, the state determining unit 41 determines that the state of the MFP 10 is the print incapable state (NO in S44), the process proceeds to S46. On the other hand, in the case where there is no problem in the remaining amount of an expendable item, the remaining amount of print medium, or the state of the hardware, the state determining unit 41 determines that the state of the MFP 10 is the print capable state (YES in S44). Thus, in the present embodiment, the MFP 10 can appropriately determine whether the state of the MFP 10 is the non-error state or the error state. In the case of YES in S44, the normal request process of FIG. 3 ends as "normal END".

In S46 the sending unit 46 sends print NG information including the NG reason due to SFL to the portable terminal 50 via the NFC I/F 22. For example, in the case of NO in S42, the NG reason indicates that the portable terminal 50 is not capable of using the print function. Further, in the case of NO in S44, the NG reason indicates that the state of the MFP 10 is the error state. In this case, the NG reason indicates the specific reason why the state of the MFP 10 is the error state (e.g., remaining amount of an expendable item is zero, remaining amount of the print medium is zero, print medium is jammed (paper jam), amount of space of the memory 34 is small, cover open, etc.). Thus, in the present embodiment, the MFP 10 can appropriately notify the portable terminal 50 that the state of the MFP 10 is the print incapable state (i.e., the error state) and the reason of the error. In the case where S46 has ended, the normal request process of FIG. 3 ends as "error END".

In S48, the usage determining unit 45 determines whether the portable terminal 50 is capable of using the scan function. Specifically, as in S42, the usage determining unit 45 refers to the SFL information 36 within the memory 34, and determines whether the scan function associated with the terminal ID "ID 50" is OK or NG. In the case where the scan function is OK, the usage determining unit 45 determines YES in S48, and the process proceeds to S52. In the case where the scan function is NG, the usage determining unit 45 determines NO in S48, and the process proceeds to S50. Moreover, in the case where the terminal ID "ID 50" is not registered in the ID-function information, the usage determining unit 45 refers to the public information (print function=NG, scan function=NG) of the SFL information 36, and determines NO in S48.

In S50 the sending unit 46 sends scan NG information including the NG reason due to SFL to the portable terminal 50 via the NFC I/F 22. The NG reason indicates that the portable terminal 50 is not capable of using the scan function. In the case where S50 has ended, the normal request process of FIG. 3 ends as "error END".

In S52 the state determining unit 41 determines whether the state of the MFP 10 is a scan capable state (i.e., the non-error state) or a scan incapable state (i.e., the error state). Specifically, the state determining unit 41 checks the state of hardware for executing the scan function and, in the case where there is a problem in the hardware, determines that the state of the MFP 10 is the scan incapable state (NO in S52). For example, in the case where a document is jammed in an automatic document feeder in the scan executing unit 18, the state determining unit 41 determines that the state of the MFP 10 is the scan incapable state. In this case, the hardware is the automatic document feeder in the scan executing unit 18. Further, e.g., in the case where the amount of space within the memory 34 is extremely small, i.e., in the case where the amount of space within the memory 34 is less than a predetermined value, the scan data cannot be processed, and consequently the state determining unit 41 determines that the state of the MFP 10 is the scan incapable state. In this case, the hardware is the memory 34. Further, e.g., in the case where, from among a plurality of members constituting the housing of the MFP 10, a cover member that must remain closed during scanning is open (i.e., the case of "cover open"), the state determining unit 41 determines that the state of the MFP 10 is the scan incapable state. In this case, the hardware is the cover member.

In the case where the state determining unit 41 determines that the state of the MFP 10 is the scan incapable state (NO in S52), the process proceeds to S54. On the other hand, in the case where there is no problem in the state of the hardware, the state determining unit 41 determines that the state of the MFP 10 is the scan capable state (YES in S52). Thus, in the present embodiment, the MFP 10 can appropriately determine whether the state of the MFP 10 is the non-error state or the error state. In the case of YES in S52, the normal request process of FIG. 3 ends as "normal END".

In S54 the sending unit 46 determines whether the MFP 10 currently belongs to a wireless network. Specifically, in the case where at least one of information indicating that the MFP 10 currently belongs to a WFD network and information indicating that the MFP 10 currently belongs to a normal Wi-Fi network is being stored in the memory 34, the sending unit 46 determines that the MFP 10 currently belongs to a wireless network (YES in S54), and proceeds to S56. On the other hand, in the case where information indicating that the MFP 10 currently belongs to a WFD network or information indicating that the MFP 10 currently belongs to a normal Wi-Fi network is not being stored in the memory 34, the sending unit 46 determines that the MFP 10 does not belong to a wireless network (NO in S54), and proceeds to S60.

In S56 the sending unit 46 determines whether the MFP 10 and the portable terminal 50 belong to an identical wireless network. Specifically, the sending unit 46 first analyzes the NFC information, and determines whether the NFC information includes a SSID and a BSSID. In the case where the NFC information does not include a SSID and a BSSID, the portable terminal 50 does not belong to a wireless network. Consequently, the sending unit 46 determines that the MFP 10 and the portable terminal 50 do not belong to an identical wireless network (NO in S56), and proceeds to S60.

In the case where the NFC information includes the SSID and BSSID, the sending unit 46 further determines whether the SSID in the NFC information (i.e., the SSID of the wireless network (the normal Wi-Fi network or WFD network) to which the portable terminal 50 belongs) and the SSID included in the wireless setting within the memory 34 (i.e., the SSID of the wireless network (the normal Wi-Fi network or WFD network) to which the MFP 10 belongs) are identical. In the case where the two SSIDs are not identical, the sending unit 46 determines that the MFP 10 and the portable terminal 50 do not belong to an identical wireless network (NO in S56), and proceeds to S60.

In the case where the two SSIDs are identical, the sending unit 46 further determines whether the BSSID in the NFC information (i.e., the BSSID of the wireless network to which the portable terminal 50 belongs) and the BSSID included in the wireless setting within the memory 34 (i.e., the BSSID of the wireless network to which the MFP 10 belongs) are identical. In the case where the two BSSIDs are not identical, the sending unit 46 determines that the MFP 10 and the portable terminal 50 do not belong to an identical wireless network (NO in S56), and proceeds to S60.

In the case where the two BSSIDs are identical, the sending unit 46 determines that the MFP 10 and the portable terminal 50 belong to an identical wireless network (YES in S56), and proceeds to S58. As described above, in the present embodiment, the determination of whether the SSIDs are identical and the determination of whether the BSSIDs are identical are both executed in S56. For example, one AP could construct a plurality of wireless networks by using a plurality of SSIDs. Consequently, in the case where the BSSIDs are identical and the SSIDs are not identical, the MFP 10 and the portable terminal 50 could belong to different wireless networks constructed by the same AP. In the present embodiment, it is possible to determine more appropriately whether the MFP 10 and the portable terminal 50 belong to the identical wireless network by executing both the determination of whether the SSIDs are identical and the determination of whether the BSSIDs are identical. Moreover, in a variant, in S56, the determination of whether the SSIDs are identical may be executed, but the determination of whether the BSSIDs are identical may not be executed.

In S58 and S60 the sending unit 46 sends scan NG information including the NG reason to the portable terminal 50 via the NFC I/F 22. The NG reason indicates the specific reason why the state of the MFP 10 is the error state (e.g., document is jammed, amount of space in the memory 34 is small, cover open, etc.). Thus, in the present embodiment, the MFP 10 can appropriately notify the portable terminal 50 that the state of the MFP 10 is the scan incapable state (i.e., the error state), and the reason of the error.

Moreover, the scan NG information sent in S58 further includes information indicating that the MFP 10 and the portable terminal 50 belong to an identical wireless network (called "NW identical information" below). On the other hand, the scan NG information sent in S60 further includes information indicating that the MFP 10 and the portable terminal 50 do not belong to an identical wireless network (called "NW non-identical information" below). In the case where S58 and S60 have ended, the normal request process of FIG. 3 ends as "error END". Moreover, in the case where the normal request process of FIG. 3 (S14 of FIG. 2) ends, the process proceeds to S18 of FIG. 2.

Upon receiving the print NG information from the MFP 10 (see S46 of FIG. 3), the portable terminal 50 executes the processes below. The portable terminal 50 first analyzes the print NG information and identifies the NG reason. For example, in the case where the NG reason indicates that the portable terminal 50 is not capable of using the print function (the case of NO in S42 of FIG. 3), the portable terminal 50 displays a screen on a displaying unit of the portable terminal 50, this indicating that the user is not capable of using the print function, without sending the NFC information including information indicating a re-request (the NFC information of the second time) to the MFP 10. Further, e.g., in the case where the NG reason indicates that the amount of space of the memory 34 is small, the portable terminal 50 displays a screen, this indicating a shortage of the amount of space within the memory 34 of the MFP 10, on the displaying unit of the portable terminal 50 without sending the NFC information including information indicating a re-request to the MFP 10.

On the other hand, in the case where the NG reason indicates another reason (e.g., remaining amount of the expendable item is zero, remaining amount of the print medium is zero, print medium is jammed (paper jam), cover open, etc.), the portable terminal 50 creates NFC information (the NFC information of the second time) including at least information indicating a re-request, information indicating the print function, the terminal ID "ID 50", and the size information indicating the data size of the print data, and sends the NFC information to the MFP 10.

Further, upon receiving the scan NG information from the MFP 10 (see S50, S58, S60 of FIG. 3), the portable terminal 50 executes the processes below. The portable terminal 50 first analyzes the scan NG information and identifies the NG reason. For example, in the case where the NG reason indicates that the portable terminal 50 is not capable of using the scan function (S50 of FIG. 3), the portable terminal 50 displays a screen indicating that the user is not capable of using the scan function on the displaying unit of the portable terminal 50 without sending the NFC information including information indicating a re-request (the NFC information of the second time) to the MFP 10. Further, e.g., in the case where the NG reason indicates that the amount of space of the memory 34 is small, the portable terminal 50 displays a screen, this indicating a shortage of the amount of space within the memory 34 of the MFP 10, on the displaying unit of the portable terminal 50 without sending the NFC information including information indicating a re-request to the MFP 10.

On the other hand, in the case where the NG reason indicates another reason (e.g., document jammed, cover open, etc.), the portable terminal 50 further analyzes the scan NG information, and determines whether the scan NG information includes NW identical information (S58 of FIG. 3) or NW non-identical information (S60 of FIG. 3). In the case where the scan NG information includes the NW non-identical information, the portable terminal 50 displays a screen on the displaying unit of the portable terminal 50, this indicating that the error state is due to the NG reason, without sending the NFC information including information indicating a re-request (the NFC information of the second time) to the MFP 10. On the other hand, in the case where the scan NG information includes the NW identical information, the portable terminal 50 creates NFC information including information indicating a re-request (the NFC information of the second time), and sends the NFC information to the MFP 10.

As described above, the portable terminal 50 can send the NFC information of the second time to the MFP 10 in accordance with the contents of the print NG information or scan NG information. Moreover, in the case where the NG reason in the print NG information or scan NG information indicates that the portable terminal 50 is not capable of using the print function or the scan function, or in the case where the NG reason indicates that the amount of space of the memory 34 is small, the MFP 10 cannot execute the print function or the scan function in accordance with the request from the portable terminal 50. Consequently, in this type of case, the portable terminal 50 does not send the NFC information of the second time to the MFP 10. Thereby, the MFP 10 does not need to receive the NFC information of the second time, and consequently does not need to execute various processes (e.g., a re-request process (to be described), a change process (to be described), etc. (S16, S20 of FIG. 2, etc.)). Consequently, the processing load of the MFP 10 can be reduced.

Moreover, as will be described in detail later, in the case where the MFP 10 and the portable terminal 50 do not belong to an identical wireless network, a state in which the MFP 10 and the portable terminal 50 belong to an identical wireless network (called "NW identical state" below) can be formed temporarily (see S118 of FIG. 5) in the change process (to be described) (see S20 of FIG. 2). In the print function, the print process is executed after a communication process (i.e., sending of print data) has been executed. Consequently, in the case where the MFP 10 is in the error state in which printing cannot be executed, a temporary NW identical state is formed by the change process (to be described), and the MFP 10 first executes a communication process (i.e., sending of print data) by using the temporary NW identical state, and then the print process can be executed in a print monitoring thread (to be described) after the temporary NW identical state has been terminated (i.e., after the WFD I/F has been turned OFF in S30 of FIG. 2). On the other hand, in the scan function, a communication process (i.e., sending of scan data) is executed after the scan process has been executed. Consequently, in the case where the MFP 10 is in the error state in which scanning cannot be executed, the MFP 10 cannot execute a communication process unless the error state is resolved. Consequently, in the case where the MFP 10 is in the error state in which scanning cannot be executed, even if a temporary NW identical state is formed by the change process (to be described), the MFP 10 cannot execute a communication process by using the temporary NW identical state.

In view of the above circumstances, in the case where the scan NG information includes the NW identical information, i.e., in the case where it is not necessary to form a temporary NW identical state by the change process (to be described) because the MFP 10 and the portable terminal 50 belong to an identical wireless network, the portable terminal 50 sends the NFC information of the second time to the MFP 10. However, in the case where the scan NG information includes the NW non-identical information, i.e., in the case where it is necessary to form a temporary NW identical state by the change process (to be described), the portable terminal 50 does not send the NFC information of the second time to the MFP 10. Thereby, the MFP 10 does not need to receive the NFC information of the second time, and consequently does not need to execute various processes (e.g., the re-request process (to be described), the change process (to be described), etc. (S16, S20 of FIG. 2, etc.)). Consequently, the processing load of the MFP 10 can be reduced.

Figure 4:
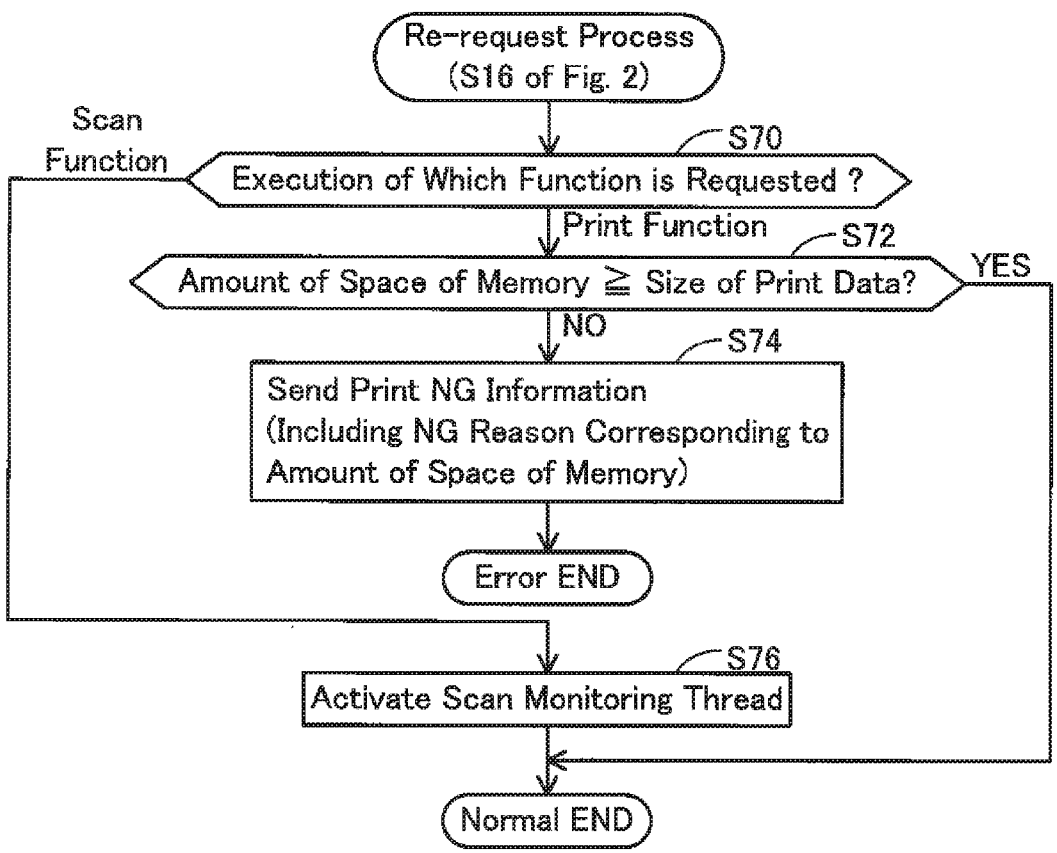
FIG. 4 shows a flowchart of a re-request process.

(Re-request Process; FIG. 4)

The contents of the re-request process executed in S16 of FIG. 2 will be described with reference to FIG. 4. In S70, the control unit 30 analyzes NFC information (the NFC information of the second time), and determines whether the NFC information includes information indicating the print function or includes information indicating the scan function. In the case where it is determined that the NFC information includes information indicating the print function, the process proceeds to S72. In the case where it is determined that the NFC information includes information indicating the scan function, the process proceeds to S76.

In S72, the size determining unit 47 determines whether the amount of space within the memory 34 is equal to or greater than the data size of the print data. As described above, in the case where the print function is determined in S70, the NFC information includes the size information indicating the data size of the print data. In S72 the size determining unit 47 analyzes the NFC information, and identifies the size information. Next, the size determining unit 47 determines whether the amount of space within the memory 34 is equal to or greater than the data size of the print data indicated by the size information.

In the case where it is determined that the amount of space within the memory 34 is equal to or greater than the data size of the print data (YES in S72), the re-request process of FIG. 4 ends as "normal END". On the other hand, in the case where it is determined that the amount of space within the memory 34 is less than the data size of the print data (NO in S72), the process proceeds to S74.

In S74 the sending unit 46 sends print NG information including the NG reason to the portable terminal 50 via the NFC I/F 22. The NG reason indicates that the amount of space within the memory 34 is less than the data size of the print data. In the case where S74 has ended, the re-request process of FIG. 4 ends as "error END". Moreover, in this case, the portable terminal 50 displays a screen on the displaying unit of the portable terminal 50, this indicating a shortage of the amount of space within the memory 34 of the MFP 10, without sending additional NFC information to the MFP 10.

Moreover, in the case where the scan function is determined in S70, in S76 the function executing unit 43 activates a scan monitoring thread. As will be described in detail later, in the scan monitoring thread, in the case where the state of the MFP 10 shifts from the error state to the non-error state, the function executing unit 43 executes the scan function including the scan process in which a scan of the document is executed and scan data is created, and the communication process in which the scan data is sent to the portable terminal 50 via the wireless LAN I/F 20.

Figure 2:
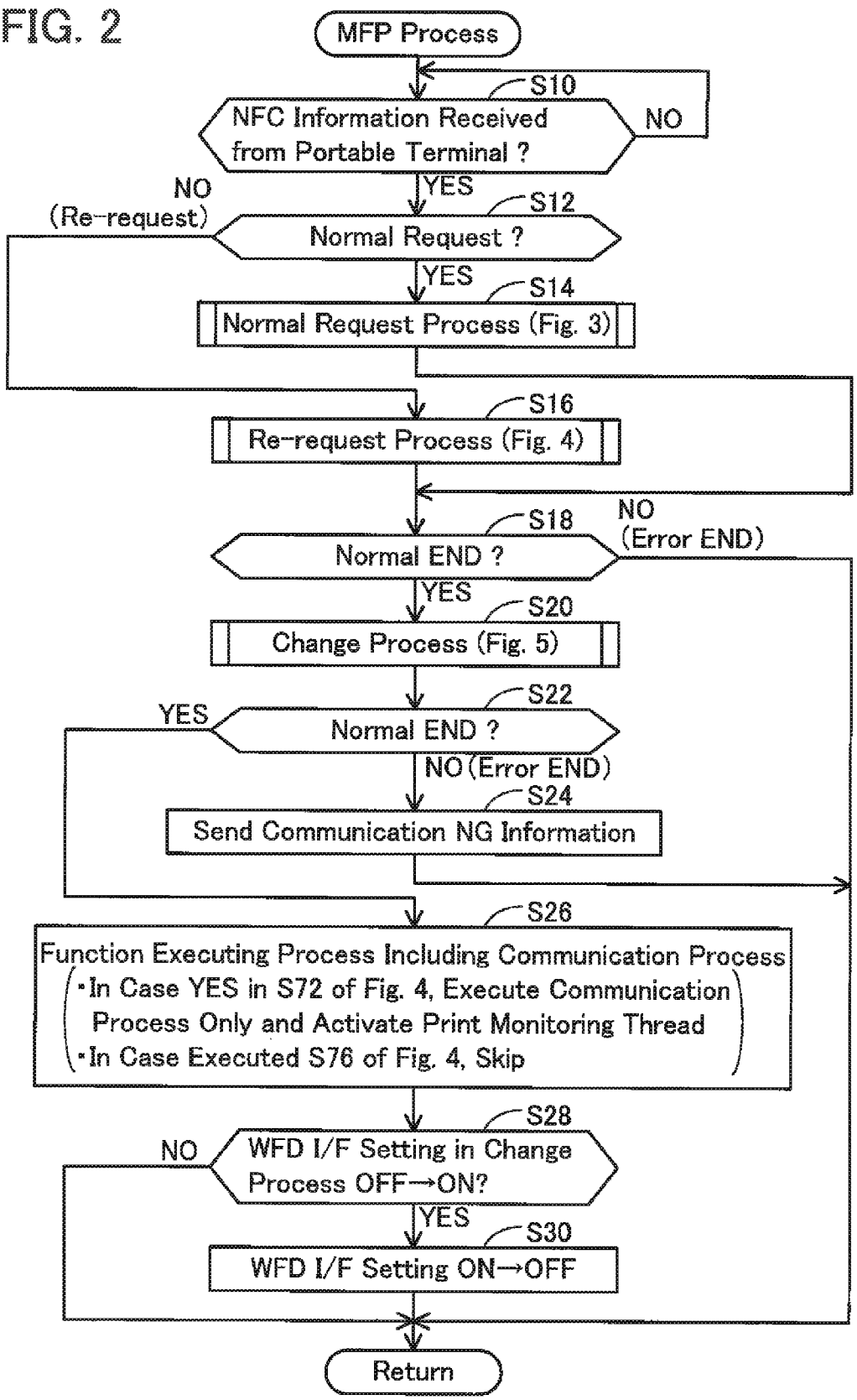
FIG. 2 shows a flowchart of an MFP process.

In the case where the normal request process of S14 of FIG. 2, or the re-request process of S16 ends, in S18 the changing unit 42 determines whether the process of S14 or S16 ended as "normal END". In the case where the process of S14 or S16 ended as "normal END", the changing unit 42 determines YES in S18, and executes the change process of S20. On the other hand, in the case where the process of S14 or S16 ended as "error END", the changing unit 42 determines NO in S18, and the process returns to S10 without the change process of S20 being executed (further, without the processes from S22 onwards being executed).

Figure 5:
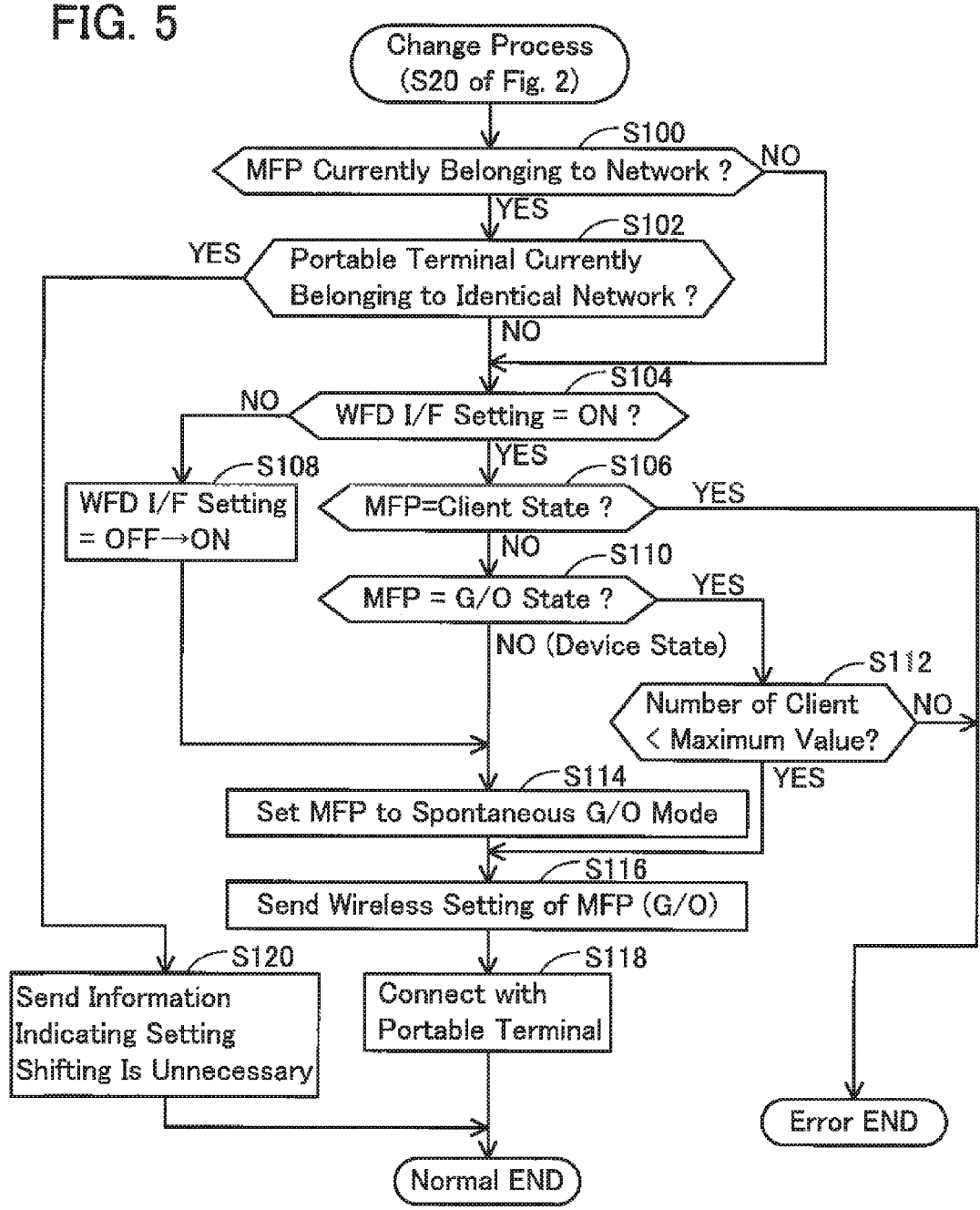
FIG. 5 shows a flowchart of a change process.

(Change Process; FIG. 5)

The contents of the change process executed in S20 of FIG. 2 will be described with reference to FIG. 5. The change process is a process for changing the interface through which the MFP 10 executes communication with the portable terminal 50 from the NFC I/F 22 to the wireless LAN I/F 20.

In S100 the changing unit 42 determines whether the MFP 10 currently belongs to a wireless network. S100 is the same as S54 of FIG. 3. In the case where the changing unit 42 determines that the MFP 10 currently belongs to a wireless network (YES in S100), the process proceeds to S102, and in the case where the changing unit 42 determines that the MFP 10 does not belong to a wireless network (NO in S100), the process proceeds to S104.

In S102, the changing unit 42 determines whether the MFP 10 and the portable terminal 50 belong to an identical wireless network. S102 is the same as S56 of FIG. 3. In the case where the changing unit 42 determines that the MFP 10 and the portable terminal 50 belong to an identical wireless network (YES in S102), the process proceeds to S120, and in the case where the changing unit 42 determines that the MFP 10 and the portable terminal 50 do not belong to an identical wireless network (NO in S102), the process proceeds to S104.

As described in S56 of FIG. 3, in S104 the changing unit 42 executes a determination by using the SSID and BSSID of the wireless network to which the portable terminal 50 currently belongs. Consequently, the changing unit 42 can appropriately execute the change process by using the SSID and BSSID included in the NFC information.

In S120 the changing unit 42 sends information indicating setting shifting is unnecessary to the portable terminal 50 via the NFC I/F 22. Thereby, the portable terminal 50 can learn that it is not necessary to change the current wireless setting of the portable terminal, i.e., that the wireless network to which the portable terminal 50 currently belongs (the normal Wi-Fi network or the WFD network) may continue to be used.

Moreover, in the change process which is executed after S76 of FIG. 4, the changing unit 42 determines YES in S100 and S102, and must execute S120. This is because S76 of FIG. 4 is executed only in the case where YES was determined in S54 and S56 of FIG. 3 (i.e., in the case where the MFP 10 and the portable terminal 50 belong to the identical wireless network). In the case where S120 ends, the change process of FIG. 5 ends as "normal END".

In S104 the changing unit 42 determines whether the WFD I/F setting within the memory 34 is ON or OFF. In the case where the WFD I/F setting is ON (YES in S104), the changing unit 42 proceeds to S106, and in the case where the WFD I/F setting is OFF (NO in S104), the changing unit 42 proceeds to S108.

In S108, without receiving an instruction from the user of the MFP 10, the changing unit 42 changes the WFD I/F setting within the memory 34 from OFF to ON. Thereby, the control unit 30 becomes able to execute processes in accordance with the WFD system (processes S114 to S118 (to be described), etc.). When S108 ends, the process proceeds to S114.

Moreover, since the WFD I/F setting is ON at the stage of executing S106, the MFP 10 is operating in one of the three states of the WFD system (G/O state, client state, and device state). Consequently, the memory 34 is storing a value (called "state value" below) indicating the state of the MFP 10 relating to the WFD system (G/O state, client state or device state).

In S106 the changing unit 42 determines whether the MFP 10 is operating in the client state. Specifically, the changing unit 42 determines whether the state value within the memory 34 is a value indicating the client state. In the case where the state value is a value indicating the client state (YES in S106), the changing unit 42 ends the change process as "error END" without continuously executing the change process. On the other hand, in the case where the state value is a value indicating the G/O state or device state (NO in S106), the changing unit 42 proceeds to S110 (i.e., executes the change process continuously).

In S110 the changing unit 42 determines whether the MFP 10 is operating in the G/O state. Specifically, the changing unit 42 determines whether the state value within the memory 34 is a value indicating the G/O state. In the case where the state value is a value indicating the G/O state (YES in S110), the changing unit 42 proceeds to S112, and in the case where the state value is a value indicating the device state (NO in S110), the changing unit 42 proceeds to S114.

In S112 the changing unit 42 determines whether the number of apparatuses other than the MFP 10 which are included in the WFD network in which the MFP 10 is operating in the G/O state is less than a predetermined maximum client number. Specifically, in the case where the number of identification information of apparatuses (i.e., client state apparatuses) registered in the administration list within the memory 34 is equal to or greater than the maximum client number, the changing unit 42 determines NO in S112, and ends the change process as "error END" without executing the change process continuously. On the other hand, in the case where the above number is less than the maximum client number, the changing unit 42 determines YES in S112, and proceeds to S116 (i.e., executes the change process continuously).

In S114 the changing unit 42 sets the MFP 10 to spontaneous G/O mode. The spontaneous G/O mode is a mode which keeps the MFP 10 operating in the G/O state. Consequently, the MFP 10 is set to the G/O state (i.e., the state value within the memory 34 is a value indicating the G/O state) although a WFD connection has not been established at the stage of S114. In the case where the MFP 10 is set to the G/O state, the changing unit 42 prepares the wireless setting (SSID, BSSID, authentication method, encryption method, password, etc.) to be used in the WFD network. Moreover, the authentication method and the encryption method are predetermined. Further, the changing unit 42 creates the password. Moreover, the SSID may be created by the changing unit 42, or may be predetermined. The BSSID is the MAC address for WFD of the MFP 10. The changing unit 42 stores the wireless setting created in S114 in the memory 34. Moreover, at this stage, identification information of the client state apparatus is not described in the administration list within the memory 34.

Next, in S116 the changing unit 42 sends the wireless setting within the memory 34 to the portable terminal 50 via the NFC I/F 22. Moreover, in S116, which is executed after S114, the wireless setting within the memory 34 is the wireless setting created in S114. Further, in S116, which is executed after YES in S112, the wireless setting within the memory 34 is a wireless setting created when it was determined in the past that the MFP 10 is operating in the G/O state. Thereby, the portable terminal 50 can use the same wireless setting as the MFP 10.

Next, in S118 the changing unit 42 establishes a WFD connection with the portable terminal 50. Specifically, the changing unit 42 executes specific wireless communication with the portable terminal 50 via the wireless LAN I/F 20. The specific wireless communication includes an Authentication Request, Authentication Response, Association Request, Association Response, and 4way handshake. Various authentication processes such as authentication of SSID, authentication of authentication method and encryption method, authentication of password, etc. are executed during the course of the specific wireless communication. In case all the authentications succeeded, a WFD connection is established between the MFP 10 and the portable terminal 50.

Moreover, in the case where both the MFP 10 and the portable terminal 50 were in the device state, when a WFD connection were to be established between the MFP 10 and the portable terminal 50, G/O negotiation would be executed to determine one of the MFP 10 and the portable terminal 50 as the G/O and to determine the other of the MFP 10 and the portable terminal 50 as the client. However, since it is ascertained that the MFP 10 is in the G/O state at the stage of executing S118, the changing unit 42 establishes the WFD connection with the portable terminal 50 without executing the G/O negotiation.

When the WFD connection is established between the MFP 10 and the portable terminal 50, the changing unit 42 further adds the MAC address of the portable terminal 50 to the administration list. Moreover, the changing unit 42 acquires the MAC address of the portable terminal 50 during the course of the specific wireless communication of S118. When the WFD connection between the MFP 10 and the portable terminal 50 has been established, the MFP 10 that is in the G/O state becomes able to communicate object data (print data, scan data, etc.) with the portable terminal 50 that is in the client state. Moreover, the object data includes network layer data, which is a layer higher than the physical layer of the OSI reference model. Consequently, the MFP 10 that is in the G/O state can execute wireless communication of the network layer with the portable terminal 50 that is in the client state. In the case where S118 ends, the change process of FIG. 5 ends as "normal END".

(Continuation of MFP Process of FIG. 2)

In the case where the change process (FIG. 5) of S20 of FIG. 2 ends, in S22 the sending unit 46 determines whether the change process of S20 ended as "normal END". In the case where the change process of S20 ended as "normal END", the sending unit 46 determines YES in S22, and proceeds to S26. On the other hand, in the case where the change process of S20 ended as "error END", the sending unit 46 determines NO in S22, and proceeds to S24.

In S24 the sending unit 46 sends communication NG information to the portable terminal 50 via the NFC I/F 22. The communication NG information includes the NG reason indicating that the wireless communication of the object data cannot be executed. Moreover, in the case where the portable terminal 50 receives the communication NG information, without sending the NFC information including information indicating a re-request (the NFC information of the second time) to the MFP 10, the portable terminal 50 displays a screen on the displaying unit of the portable terminal 50 indicating that the wireless communication of the object data cannot be executed.

Next, in S26 the function executing unit 43 executes a function executing process including a communication process. In the case where the NFC information received in S10 includes information indicating the print function, in S26 the function executing unit 43 first executes a communication process for receiving print data from the portable terminal 50 via the wireless LAN I/F 20. Next, the function executing unit 43 executes the print process in accordance with print data. That is, the function executing unit 43 executes various processes (color conversion process, halftone process, etc.) on the print data, generating processed data, and then supplies the processed data to the print executing unit 16. Thereby, the print executing unit 16 prints an image on a print medium in accordance with the processed data.

Further, in the case where the NFC information received in S10 includes information indicating the scan function, in S26 the function executing unit 43 first executes a scan process. That is, the function executing unit 43 causes the scan executing unit 18 to scan a document that has been set on the scan executing unit 18. The function executing unit 43 acquires the original image data obtained by scanning, and executes various processes (correction process, etc.) on the original image data, creating scan data. Next, the function executing unit 43 executes a communication process for sending the scan data to the portable terminal 50 via the wireless LAN I/F 20.

Moreover, in S26, which is executed after YES in S72 of FIG. 4, the function executing unit 43 executes a communication process for receiving the print data, and stores the print data in the memory 34, but does not execute the print process. In this case, the function executing unit 43 activates the print monitoring thread. Further, in the case where S76 of FIG. 4 was executed (i.e., the case where the scan monitoring thread was activated), the function executing unit 43 skips the process S26.

Next, in S28 the changing unit 42 determines whether the process 5108 of FIG. 5 (the process of changing the WFD I/F setting from OFF to ON) was executed in the change process of S20. In the case where the process 5108 was executed (YES in S28), in S30 the changing unit 42 changes the WFD I/F setting from ON to OFF. Thereby, in the case where the changing unit 42 changed the WFD I/F setting to ON without receiving an instruction from the user, the changing unit 42 can return the WFD I/F setting to its setting prior to changing (i.e., OFF). In this case, the WFD connection established in S118 of FIG. 5 is disconnected, and the WFD network ceases to exist.

Moreover, in the case where the process 5108 was not executed (NO in S28), the changing unit 42 skips S30. In the case of NO in S28, or in the case where S30 has ended, the process returns to S10.

(Print Monitoring Thread)

As described above, the print monitoring thread can be activated in S26 of FIG. 2. In the print monitoring thread, the function executing unit 43 monitors whether the state of the MFP 10 has changed from the print incapable state to the print capable state. In the case where the user of the MFP 10 has removed the cause of the MFP 10 assuming the print incapable state (e.g., has closed the cover member, has removed the print medium jammed in the transport path of the print medium, has replenished the expendable item or print medium, etc.), the function executing unit 43 determines that the state of the MFP 10 has changed to the print capable state. In the case of determining that the state of the MFP 10 has changed to the print capable state, the function executing unit 43 executes the print process in accordance with the print data within the memory 34.

(Scan Monitoring Thread)

As described above, the scan monitoring thread can be activated in S76 of FIG. 4. In the scan monitoring thread, the function executing unit 43 monitors whether the state of the MFP 10 has changed from the scan incapable state to the scan capable state. In the case where the user of the MFP 10 has removed the cause of the MFP 10 assuming the scan incapable state (e.g., has closed the cover member, has removed the document jammed in the automatic document feeder, etc.), the function executing unit 43 determines that the state of the MFP 10 has changed to the scan capable state. In the case of determining that the state of the MFP 10 has changed to the scan capable state, the function executing unit 43 executes the scan process for creating scan data. Next, the function executing unit 43 executes a communication process for sending the scan data to the portable terminal 50 via the wireless LAN I/F 20.

Next, specific cases realized by the MFP 10 and the portable terminal 50 will be described with reference to FIG. 6 to FIG. 13. The cases of FIG. 6 to FIG. 13 are realized by the MFP 10 executing the processes of FIG. 2 to FIG. 5.

Figure 6:
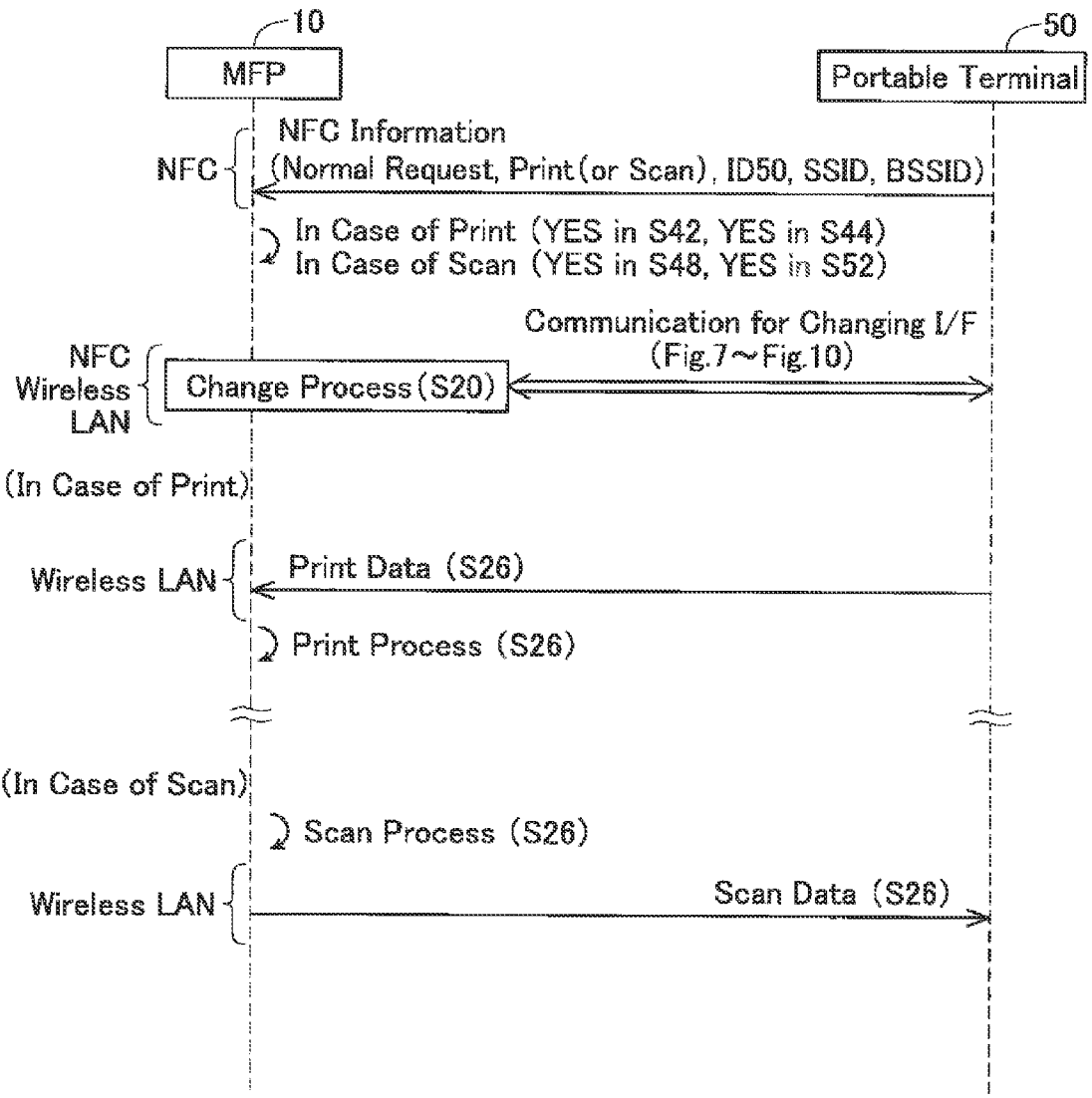
FIG. 6 shows a sequence view of a case A.

(Case A; FIG. 6)

In case A, the state of the MFP 10 is the non-error state (i.e., the print capable state and the scan capable state), and print function "OK" and scan function "OK" are associated with the terminal ID "ID 50" in the SFL information 36.

The MFP 10 receives NFC information from the portable terminal 50 via the NFC I/F 22 (YES in S10 of FIG. 2). The NFC information includes information indicating a normal request. For example, in the case where the NFC information includes information indicating the print function (called "printing case" below), the MFP 10 determines YES in S42 of FIG. 3, and determines YES in S44. Further, e.g., in the case where the NFC information includes information indicating the scan function (called "scanning case" below), the MFP 10 determines YES in S48 of FIG. 3, and determines YES in S52. In both the printing case and the scanning case, the normal request process ends as "normal END".

Next, the MFP 10 executes the change process S20 of FIG. 2. Thereby, communication is executed to change the interface, which is to be used for communication between the MFP 10 and the portable terminal 50, from the NFC I/F to the wireless LAN I/F (S116 to 5120 of FIG. 5; called "communication for changing I/F" below). Moreover, in the communication for changing I/F, communication via the NFC I/F 22 may be executed (S116, 5120 of FIG. 5), and communication via the wireless LAN I/F 20 may be executed (S118 of FIG. 5). Consequently, "NFC" and "wireless LAN" are both written at the left side of the change process of FIG. 6.

In the printing case, the MFP 10 executes a communication process for receiving the print data from the portable terminal 50 via the wireless LAN I/F 20 (S26), and then executes the print process in accordance with the print data (S26). Thereby, the MFP 10 can execute the print function in accordance with the instruction from the portable terminal 50.

Further, in the scanning case, the MFP 10 executes the scan process for creating the scan data (S26), and then executes a communication process to send the scan data to the portable terminal 50 via the wireless LAN I/F 20 (S26). Thereby, the MFP 10 can execute the scan function in accordance with the instruction from the portable terminal 50.

Figure 7:
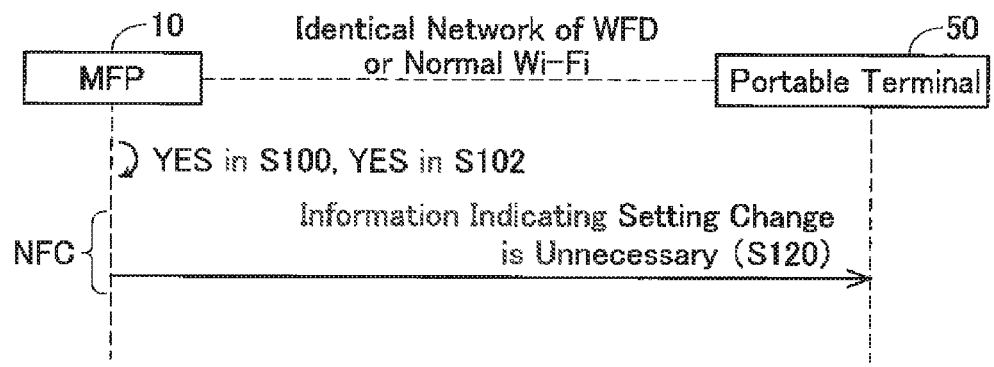
FIG. 7 shows a sequence view of a case X1.

(Case X1; FIG. 7)

Cases X1 to X4 of FIG. 7 to FIG. 10 show examples of communication for changing I/F. In case X1, the MFP 10 and the portable terminal 50 already belong to an identical wireless network (WFD network or normal Wi-Fi network) at the time the communication of NFC information is executed.

The MFP 10 determines YES in S100 of FIG. 5, and determines YES in S102. Consequently, in S120 the MFP 10 sends the information indicating setting shifting is unnecessary to the portable terminal 50 via the NFC I/F 22. In this case, the MFP 10 executes the communication of object data (print data or scan data) with the portable terminal 50 via the wireless LAN I/F 20 by using the existing wireless network (S26 of FIG. 2).

Figure 8:
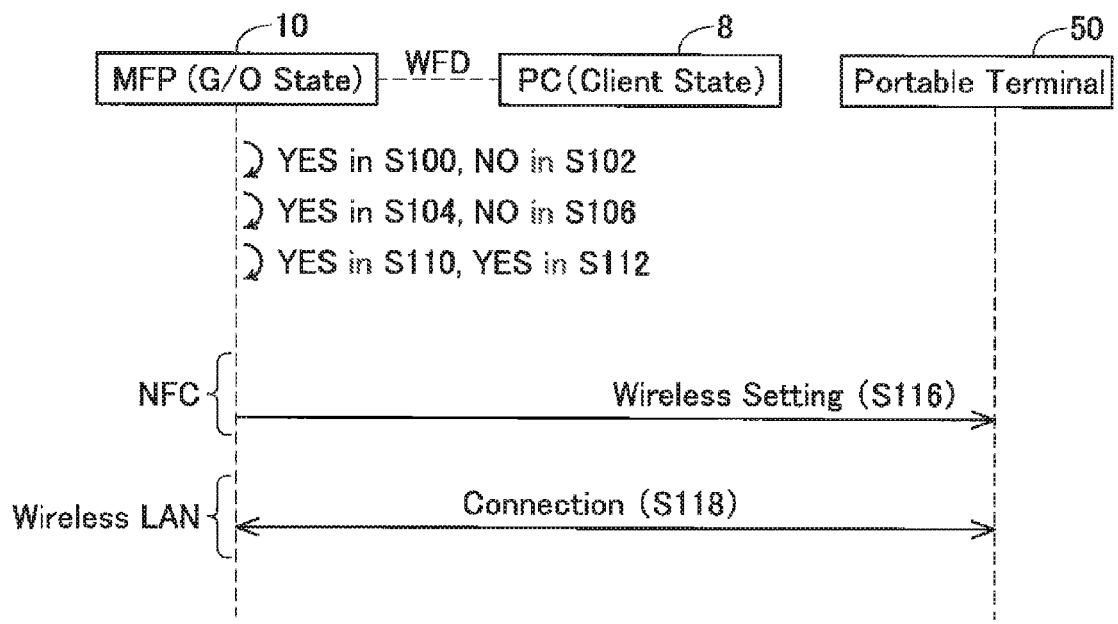
FIG. 8 shows a sequence view of a case X2.

(Case X2; FIG. 8)

In case X2, the MFP 10 and the PC 8 have constructed a WFD network, and the MFP 10 is operating in the G/O state. Moreover, the portable terminal 50 does not belong to the WFD network.

The MFP 10 determines YES in S100 of FIG. 5, determines NO in S102, determines YES in S104, determines NO in S106, determines YES in S110, and determines YES in S112. Consequently, in S116 the MFP 10 sends a wireless setting for the portable terminal 50 to join the WFD network (i.e., a wireless setting created at the time the MFP 10 became the G/O) to the portable terminal 50 via the NFC I/F 22. Next, in S118 the MFP 10 establishes a WFD connection with the portable terminal 50 via the wireless LAN I/F 20.

Thereby, the portable terminal 50 can newly join the WFD network to which the MFP 10 and the PC 8 belong. In this case, by using the WFD network, the MFP 10 executes the communication of object data (print data or scan data) with the portable terminal 50 via the wireless LAN I/F 20 (S26 of FIG. 2).

(Case X3; FIG. 9)

In case X3, the MFP 10 does not belong to a wireless network, and the MFP 10 is operating in the device state (i.e., the WFD I/F setting is ON). Moreover, the portable terminal 50 also does not belong to a wireless network.

The MFP 10 determines NO in S100 of FIG. 5, determines YES in S104, determines NO in S106, and determines NO in S110. Consequently, in S114 the MFP 10 is set to the spontaneous G/O mode. At this juncture, the MFP 10 creates a wireless setting to be used in the newly constructed WFD network. Next, in S116, the MFP 10 sends a wireless setting for the portable terminal 50 to join the WFD network (i.e., the wireless setting created by the MFP 10 in S114) to the portable terminal 50 via the NFC I/F 22. Next, in S118 the MFP 10 establishes a WFD connection with the portable terminal 50 via the wireless LAN I/F 20.

Thereby, a new WFD network is constructed that includes the MFP 10 and the portable terminal 50. In this case, by using the WFD network, the MFP 10 executes the communication of object data (print data or scan data) with the portable terminal 50 via the wireless LAN I/F 20 (S26 of FIG. 2).

(Case X4; FIG. 10)

In case X4, the MFP 10 does not belong to a wireless network, and the WFD I/F setting of the MFP 10 is OFF. Moreover, the portable terminal 50 also does not belong to a wireless network.

The MFP 10 determines NO in S100 of FIG. 5, and determines NO in S104. Consequently, in S108 the MFP 10 changes the WFD I/F setting from OFF to ON. Next, in S114 the MFP 10 is set to the spontaneous G/O mode. At this juncture, the MFP 10 creates a wireless setting to be used in the newly constructed WFD network. Next, in S116 the MFP 10 sends a wireless setting for the portable terminal 50 to join the WFD network (i.e., the wireless setting created by the MFP 10 in S114) to the portable terminal 50 via the NFC I/F 22. Next, in S118 the MFP 10 establishes a WFD connection with the portable terminal 50 via the wireless LAN I/F 20.

Thereby, a new WFD network is constructed that includes the MFP 10 and the portable terminal 50. In this case, by using the WFD network, the MFP 10 executes the communication of object data (print data or scan data) with the portable terminal 50 via the wireless LAN I/F 20 (S26 of FIG. 2).

Next, the MFP 10 determines YES in S28 of FIG. 2, and in S30 changes the WFD I/F setting from ON to OFF. Thereby, the WFD network ceases to exist. This is because the G/O ceases to be present. That is, the WFD network is a wireless network constructed temporarily for the communication process of S26 of FIG. 2.

(Case B; FIG. 11)

In case B, the state of the MFP 10 is the non-error state (i.e., the print capable state and the scan capable state) and, in the SFL information 36, print function "OK" is associated with the terminal ID "ID 50", and scan function "NG" is associated with the terminal ID "ID 50".

The MFP 10 receives NFC information from the portable terminal 50 via the NFC I/F 22 (YES in S10 of FIG. 2). The NFC information includes information indicating a normal request and information indicating the print function. In this case, as in case A of FIG. 6, the MFP 10 executes the change process (S20 of FIG. 2), executes a communication process for receiving the print data (S26), and then executes the print process in accordance with the print data (S26). Thereby, the MFP 10 can execute the print function in accordance with the instruction from the portable terminal 50.

Next, the MFP 10 receives NFC information from the portable terminal 50 via the NFC I/F 22 (YES in S10 of FIG. 2). The NFC information includes information indicating a normal request and information indicating the scan function. In this case, the MFP 10 determines NO in S48 of FIG. 3 and, in S50, sends the scan NG information to the portable terminal 50 via the NFC I/F 22.

Consequently, the normal request process ends as "error END". Thereby, the MFP 10 determines NO in S18 of FIG. 2, and does not execute the change process of S20. Further, the portable terminal 50 receives the scan NG information that includes the NG reason due to SFL, and consequently does not send NFC information including information indicating a re-request to the MFP 10.

(Case C; FIG. 12)

In case C, the state of the MFP 10 is the error state (i.e., the print incapable state due to cover open), and print function "OK" is associated with the terminal ID "ID 50" in the SFL information 36.

The MFP 10 receives NFC information from the portable terminal 50 via the NFC I/F 22 (YES in S10 of FIG. 2). The NFC information includes information indicating a normal request and information indicating the print function. The MFP 10 determines YES in S42 of FIG. 3, and determines NO in S44. In this case, in S46 the MFP 10 sends the print NG information including the NG reason indicating cover open to the portable terminal 50 via the NFC I/F 22.

Consequently, the normal request process ends as "error END". Thereby, the MFP 10 determines NO in S18 of FIG. 2, and does not execute the change process of S20. On the other hand, upon receiving the print NG information from the MFP 10, the portable terminal 50 sends, to the MFP 10, NFC information including at least information indicating a re-request, information indicating the print function, and the size information indicating the data size of the print data.

The MFP 10 receives the NFC information from the portable terminal 50 via the NFC I/F 22 (YES in S10 of FIG. 2). In the case where the amount of space of the memory 34 is equal to or greater than the data size of the print data, the MFP 10 determines YES in S72 of FIG. 4.

Consequently, the re-request process ends as "normal END". Thereby, the MFP 10 determines YES in S18 of FIG. 2, executes the change process of S20, and executes a communication process for receiving the print data (S26). The MFP 10 stores the print data in the memory 34, then activates the print monitoring thread (S26). In the case where the state of the MFP 10 has changed from the print incapable state to the print capable state, in the print monitoring thread the MFP 10 executes the print process in accordance with the print data. Thereby, the MFP 10 can execute the print function in accordance with the instruction from the portable terminal 50.

On the other hand, in the case where the amount of space of the memory 34 is less than the data size of the print data, the MFP 10 determines NO in S72 of FIG. 4. In this case, in S74 the MFP 10 sends the print NG information including the NG reason, this indicating a shortage of the amount of space of the memory 34, to the portable terminal 50 via the NFC I/F 22.

Consequently, the re-request process ends as "error END". Thereby, the MFP 10 determines NO in S18 of FIG. 2, and does not execute the change process of S20. Further, since the portable terminal 50 receives the print NG information including the NG reason indicating a shortage of the amount of space of the memory 34, the portable terminal 50 does not send NFC information including information indicating a re-request to the MFP 10.

(Case D; FIG. 13)

In case D, the state of the MFP 10 is the error state (i.e., the scan incapable state due to cover open), and scan function "OK" is associated with the terminal ID "ID 50" in the SFL information 36. Moreover, the MFP 10 and the portable terminal 50 belong to an identical WFD or normal Wi-Fi wireless network.

The MFP 10 receives NFC information from the portable terminal 50 via the NFC I/F 22 (YES in S10 of FIG. 2). The NFC information includes information indicating a normal request and information indicating the scan function. The MFP 10 determines YES in S48 of FIG. 3 and determines NO in S52. The MFP 10 and the portable terminal 50 already belong to an identical wireless network at the time the communication of NFC information is executed. Consequently, the MFP 10 determines YES in S54, and determines YES in S56. In this case, in S58 the MFP 10 sends scan NG information including the NG reason indicating cover open and the NW identical information to the portable terminal 50 via the NFC I/F 22.

Consequently, the normal request process ends as "error END". Thereby, the MFP 10 determines NO in S18 of FIG. 2, and does not execute the change process of S20. On the other hand, when the portable terminal 50 receives the scan NG information from the MFP 10, the portable terminal 50 sends, to the MFP 10, NFC information including at least information indicating a re-request and information indicating the scan function.

The MFP 10 receives NFC information from the portable terminal 50 via the NFC I/F 22 (YES in S10 of FIG. 2). In this case, in S76 of FIG. 4 the MFP 10 activates the scan monitoring thread.

Consequently, the re-request process ends as "normal END". Thereby, the MFP 10 determines YES in S18 of FIG. 2, and executes the change process of S20. However, in the change process of S20, the MFP 10 determines YES in S102 of FIG. 5. This is because the MFP 10 and the portable terminal 50 belong to an identical wireless network. Consequently, in S120 the MFP 10 sends the information indicating setting shifting is unnecessary to the portable terminal 50 via the NFC I/F 22. Moreover, in this case, the MFP 10 skips process S26 of FIG. 2.

In the case where the state of the MFP 10 changes from the scan incapable state to the scan capable state, in the scan monitoring thread the MFP 10 executes the scan process, and then executes a communication process for sending scan data.

Thereby, the MFP 10 can execute the scan function in accordance with the instruction from the portable terminal 50.

Moreover, although not shown as a specific case, in the case where the terminal ID "ID 50" included in the NFC information sent to the MFP 10 from the portable terminal 50 is not registered in the SFL information 36 (i.e., the ID-function information), the MFP 10 determines NO in S42 or S48 of FIG. 3, and sends, to the portable terminal 50, print NG information or scan NG information including the NG reason due to SFL. In this case, the normal request process ends as "error END". Thereby, the MFP 10 determines NO in S18 of FIG. 2, and does not execute the change process of S20. Further, the portable terminal 50 receives the print NG information or scan NG information including the NG reason due to SFL, and consequently does not send NFC information including information indicating a re-request to the MFP 10.

(Result of Present Embodiment)

As described above, in the case of receiving NFC information from the portable terminal 50 via the NFC I/F 22, the MFP 10 determines whether the state of the MFP 10 is the non-error state or the error state (S44, S52 of FIG. 3). As shown in case A of FIG. 6, in the case of determining that the state of the MFP 10 is the non-error state, the MFP 10 executes the change process S20 of FIG. 2, and can appropriately execute the communication of the object data (print data or scan data) with the portable terminal 50 via the wireless LAN I/F 20. Consequently, the MFP 10 can appropriately execute the print function or scan function in accordance with the instruction from the portable terminal 50. On the other hand, as shown in cases C, D of FIGS. 12, 13, in the case of determining that the state of the MFP 10 is the error state, the MFP 10 does not execute the change process S20 of FIG. 2. Thereby, the situation can be prevented from occurring in which the change process is executed even though the state of the MFP 10 is the error state. Thereby, the processing load of the MFP 10 can be reduced. Thus, the MFP 10 can execute an appropriate operation in accordance with the determination results relating to the state of the MFP 10.

Further, in the case of receiving NFC information from the portable terminal 50 via the NFC I/F 22, the MFP 10 determines whether the portable terminal 50 is capable of using a function (S42, S48 of FIG. 3). As shown in case B of FIG. 11, in the case of determining that the NFC information includes information indicating the print function and that the portable terminal 50 is capable of using the print function (YES in S42 of FIG. 3), the MFP 10 executes the change process S20 of FIG. 2, and can appropriately execute the communication of the print data with the portable terminal 50 via the wireless LAN I/F 20. Consequently, the MFP 10 can appropriately execute the print function in accordance with the instruction from the portable terminal 50. On the other hand, in the case of determining that the NFC information includes information indicating the scan function and that the portable terminal 50 is not capable of using the scan function (NO in S48 of FIG. 3), the MFP 10 does not execute the change process S20 of FIG. 2. Thereby, the situation can be prevented from occurring in which the change process is executed even though the portable terminal 50 is not capable of using the scan function. Thereby, the processing load of the MFP 10 can be reduced. Thus, the MFP 10 can execute an appropriate operation in accordance with the determination results relating to the functions used by the portable terminal 50.

(Corresponding Relationships)

The MFP 10 is an example of the "function executing device". The portable terminal 50 is an example of the "terminal device". The NFC I/F 22 and the wireless LAN I/F 20 are respectively examples of the "first type of interface" and the "second type of interface". Further, the "print function" and the "scan function" in case B of FIG. 11 are respectively examples of the "first function" and the "second function". The NFC information including information indicating a normal request is an example of the "first information". The SSID and BSSID included in this NFC information are examples of the "relation information". Further, the NFC information including information indicating a re-request and information indicating the print function, and the NFC information including information indicating a re-request and information indicating the scan function are respectively examples of the "second information" and the "third information". Further, the SFL information 36 (i.e., the ID-function information and the public information) is an example of the "permission information". The print NG information and the scan NG information are examples of the "impossibility information". The G/O state and the client state are respectively examples of the "parent station state" and the "child station state". S112 of FIG. 5 is an example of the "apparatus number determining process".

(Variant 1) The "function executing device" is not restricted to the multi-function peripheral capable of executing the print function and the scan function, but may be a printer capable of executing only the print function from among the print function and the scan function, or may be a scanner capable of executing only the scan function from among the print function and the scan function. Further, the "function executing device" may be a device (e.g., a PC, server, mobile phone, Smart Phone, etc.) that executes a function different from the print function and the scan function (e.g., an image display function, data calculation function).

(Variant 2) The "specific function" may be the "print function" or "scan function", as in case A of FIG. 6, or may be a function different from the print function and the scan function. For example, in the case where the different function is the image display function, the image data representing the image is an example of the "object data". Further, e.g., in the case where the different function is the data calculation function, the data that is the calculation target is an example of the "object data".

(Variant 3) The combination of the "first type of interface" and the "second type of interface" is not restricted to the combination of the NFC I/F and the wireless LAN I/F. For example, in the case where the wireless LAN I/F is adopted as the "second type of interface", the "first type of interface" may be an interface for executing infrared communication, an interface for executing Bluetooth (registered trademark), or an interface for executing Transfer Jet. Further, in the case where the NFC I/F is adopted as the "first type of interface", the "second type of interface" may be an interface for executing wired communication, or an interface for executing Bluetooth (registered trademark). In general terms, the combination of the interfaces may be any combination whereby the communication speed of communication via the second type of interface is faster than the communication speed of communication via the first type of interface.

(Variant 4) The "first type of interface" and the "second type of interface" may physically be two interfaces (i.e., two separate IC chips), as in the above embodiment, or may physically be one interface (i.e., two types of communication are realized with one IC chip).

(Variant 5) The "change process" is not restricted to the processes of FIG. 5, but includes any process for changing the interface for communicating with the portable terminal from the first type of interface to the second type of interface. For example, the following processes can be illustrated.

(Variant 5-1) For example, in the case of YES in S106 of FIG. 5 (i.e., the case where the MFP 10 is in the client state), the changing unit 42 may change the state of the MFP 10 from the client state to the device state (i.e., disconnect the MFP 10 from the WFD network), and then proceed to S114 (spontaneous G/O mode) (an example of the "change process").

(Variant 5-2) For example, in the case of YES in S106 of FIG. 5 (i.e., the case where the MFP 10 is in the client state), the changing unit 42 may send the wireless setting being used in the WFD network to which the MFP 10 currently belongs (i.e., a wireless setting created by a G/O apparatus different from the MFP 10) to the portable terminal 50 via the NFC I/F 22 (an example of the "change process"). Thereby, the portable terminal 50 can establish a WFD connection with the G/O apparatus (i.e., can join the WFD network). Consequently, the function executing unit 43 can execute the object data communication process with the portable terminal 50 via the G/O apparatus.

(Variant 5-3) For example, in the case of YES in S100 of FIG. 5 (i.e., the case where the MFP 10 currently belongs to a wireless network) and the wireless network to which the MFP 10 belongs is a normal Wi-Fi network constructed by the AP 6, the changing unit 42 may send the wireless setting being used in the normal Wi-Fi network (i.e., the wireless setting created by the AP 6) to the portable terminal 50 via the NFC I/F 22 (an example of the "change process"). Thereby, the portable terminal 50 can establish a normal Wi-Fi connection with the AP 6 (i.e., can join the normal Wi-Fi network). Consequently, the function executing unit 43 can execute the object data communication process with the portable terminal 50 via the AP 6.

(Variant 5-4) For example, the NFC information may include the wireless setting that is being used in the wireless network (WFD network or normal Wi-Fi network) to which the portable terminal 50 currently belongs. For example, in the case of NO in S100 of FIG. 5 (i.e., the case where the MFP 10 does not belong to a wireless network), or in the case of NO in S102 (i.e., the case where the MFP 10 and the portable terminal 50 do not belong to an identical network), the changing unit 42 may newly join the wireless network to which the portable terminal 50 currently belongs by using the wireless setting in the NFC information (an example of the "change process"). In this case, the function executing unit 43 can execute the object data communication process with the portable terminal 50 by using the wireless network which was newly joined.

(Variant 5-5) For example, the NFC information may include the IP address of the portable terminal 50 that is being used in the wired network to which the portable terminal 50 currently belongs. For example, in the case where an interface for executing wired communication has been adopted as the "second type of interface", the changing unit 42 may send information indicating the execution of wired communication to the portable terminal 50 via the NFC I/F 22. In this case, the function executing unit 43 can execute the object data communication process with the portable terminal 50 via the wired network.

(Variant 6) The normal request process of FIG. 3 may be configured such that, after "print function" is determined in S40, S42 is skipped, and the process proceeds to S44. Further, the normal request process of FIG. 3 may be configured such that, after "scan function" is determined in S40, S48 and S50 are skipped, and the process proceeds to S52. That is, the control unit 30 comprises the state determining unit 41 and may not comprise the usage determining unit 45.

(Variant 7) The normal request process of FIG. 3 may be configured such that, in the case of YES in S42, S44 is skipped, and the process proceeds to "normal END". Further, the process may be configured such that, in the case of YES in S48, S52 to S60 are skipped, and the process proceeds to "normal END". That is, the control unit 30 comprises the usage determining unit 45 and may not comprise the state determining unit 41.

(Variant 8) The "permission information" is not restricted to the SFL information 36, but includes all information indicating whether the portable terminal is capable of using the specific function. For example, the following information can be illustrated.

(Variant 8-1) The memory 34 may store user-function information in which the following are associated: the user ID, information indicating whether the print function is "OK" or "NG", and information indicating whether the scan function is "OK" or "NG". Instead of the terminal ID of the portable terminal 50, the NFC information may include the user ID of the user of the portable terminal 50. The usage determining unit 45 may determine whether the user of the portable terminal 50 is capable of using a specific function by using the user ID in the NFC information and the user-function information. In the present variant, the user-function information is an example of the "permission information".

(Variant 8-2) The memory 34 may store the user-function information and terminal-user information. The terminal-user information may be information in which the terminal ID and the user ID are associated. The NFC information may include the terminal ID of the portable terminal 50. The usage determining unit 45 may identify the user ID by using the terminal ID in the NFC information and the terminal-user information, and then determine whether the user of the portable terminal 50 is capable of using a specific function by using the identified user ID and the user-function information. In the present variant, the combination of the user-function information and the terminal-user information is an example of the "permission information".

(Variant 8-3) The memory 34 need not store the SFL information 36 in which the terminal ID and function OK or NG are associated. By operating the operating unit 12, the user may be able to specify whether the SFL function of the MFP 10 is valid or invalid. Thereupon, the memory 34 may store valid information in the case where SFL function=valid was specified, and store invalid information in the case where SFL function=invalid was specified. In this case, in the case where the invalid information is being stored in the memory 34, the usage determining unit 45 may determine that the portable terminal 50 is capable of using all the functions (i.e., the print function, the scan function) regardless of whether it does or does not receive the terminal ID from the portable terminal 50 and, in the case where the valid information is being stored in the memory 34, the usage determining unit 45 may determine that the portable terminal 50 is not capable of using any function. In the present variant, the valid information and the invalid information are examples of the "permission information".

(Variant 9) In the above embodiment, the receiving unit 40 receives the NFC information that includes the information indicating the function (print function or scan function), and the relation information (SSID, BSSID) relating to the wireless network to which the portable terminal 50 currently belongs by executing NFC system wireless communication once with the portable terminal 50. Instead, the receiving unit 40 may receive the NFC information including information indicating function by executing NFC system wireless communication with the portable terminal 50, and may then receive the NFC information including the relation information by re-executing NFC system wireless communication with the portable terminal 50. That is, the "first information" including the "execution request of the function" and the "relation information" may be information received by the NFC system wireless communication being executed once, as in the above embodiment, or may be information received by the NFC system wireless communication being executed a plurality of times, as in the present variant.

(Variant 10) In the above embodiment, the receiving unit 40 receives the NFC information that includes the information indicating a re-request and the size information indicating the data size of the print data by executing the NFC system wireless communication once with the portable terminal 50. Instead, the receiving unit 40 may receive the NFC information including information indicating a re-request by executing NFC system wireless communication with the portable terminal 50, and may then receive the NFC information including the size information by re-executing NFC system wireless communication with the portable terminal 50. That is, the "second information" may be information received by the NFC system wireless communication being executed once, as in the above embodiment, or may be information received by the NFC system wireless communication being executed a plurality of times, as in the present variant.

(Variant 11) In the above embodiment, the state determining unit 41 determines whether the MFP 10 is in the print capable state using all three decision criteria: the remaining amount of an expendable item, the remaining amount of print medium, and the state of hardware (S44 of FIG. 3). Instead, the state determining unit 41 may execute a determination using only one decision criterion of the three decision criteria, or may execute a determination using only two decision criteria of the three decision criteria. That is, the state determining unit 41 may execute a determination using at least one decision criterion of the three decision criteria.

(Variant 12) In the above embodiment, the units 40 to 47 are realized by software. However, at least one of the units 40 to 47 may be realized by hardware such as a logic circuit, etc.

The invention claimed is:

1. A function executing device comprising:
   a first type of communication interface;
   a second type of communication interface;
   one or more processors; and
   a memory that stores computer-readable instructions therein, the computer-readable instructions, when executed by the one or more processors, causing the function executing device to execute:
   (a) receiving first information including an execution request of a specific function via the first type of communication interface, the specific function including a communication process for communicating object data with a terminal device;
   (b) determining, in a case where the first information is received, whether a state of the function executing device is a non-error state in which the function executing device is capable of executing the specific function or an error state in which the function executing device is not capable of executing the specific function;
   (c) executing a change process for changing an interface for communicating with the terminal device from the first type of communication interface to the second type of communication interface in a case where the state of the function executing device is determined to be the non-error state, and not executing the change process in a case where the state of the function executing device is determined to be the error state; and
   (d) executing the specific function including the communication process via the second type of communication interface in a case where the change process is being executed,
   wherein, in a case where the specific function is a print function including the communication process of receiving print data as the object data from the terminal device and a print process to be performed in accordance with the print data, the process (b) includes determining whether the state of the function executing device is the non-error state or the error state using: a remaining amount of an expendable item for executing the print function, a remaining amount of print medium for executing the print function, a state of a hardware for executing the print function, or a combination thereof,
   wherein the function executing device is configured to selectively operate in one of a plurality of states including a parent station state functioning as a parent station of a wireless network, a child station state functioning as a child station of the wireless network, and a device state different from the parent station state and the child station state,
   wherein the second type of communication interface is an interface for the function executing device operating either in the parent station state or the child station state to execute the communication process, and
   wherein, in a case where the function executing device operates in the parent station state in a specific wireless network to which the function executing device currently belongs, the change process includes an apparatus number determining process of determining whether or not a number of child station apparatuses operating in the child station state is less than a predetermined value, and the process (c) includes:
   executing the change process continuously in a case where the number of child station apparatuses is less than the predetermined value; and
   not executing the change process continuously in a case where the number of child station apparatuses is equal to or more than the predetermined value.

2. The function executing device as in claim 1, wherein:
the computer-readable instructions, when executed by the one or more processors, causes the function executing device to further execute:
   (e) storing, in the memory of the function executing device, permission information indicating whether or not the terminal device is capable of using the specific function; and
   (f) determining whether or not the terminal device is capable of using the specific function using the permission information in the memory in a case where the first information is received,
process (c) includes:
   executing the change process in a case where it is determined that the state of the function executing device is the non-error state and it is determined that the terminal device is capable of using the specific function; and
   not executing the change process in a case where it is determined that the terminal device is not capable of using the specific function.

3. The function executing device as in claim 1, wherein:
the first information further includes relation information relating to a wireless network to which the terminal device currently belongs, and
the process (c) includes executing the change process using the relation information.

4. The function executing device as in claim 1, wherein the computer-readable instructions, when executed by the one or more processors, causes the function executing device to further execute sending, via the first type of communication interface to the terminal device, impossibility information indicating that the function executing device is not capable of executing the specific function in a case where it is determined that the state of the function executing device is the error state.

5. The function executing device as in claim 4, wherein:
in a case where the specific function is a scan function including a scan process of generating scan data executing a scan of a document and the communication process of sending to the terminal device the scan data being the object data,
the computer-readable instructions, when executed by the one or more processors, causing the function executing device to further execute receiving third information including an execution request of the scan function via the first type of communication interface after the impossibility information is sent to the terminal device, and
the process (d) includes executing the scan function in a case where the state of the function executing device shifts from the error state to the non-error state after the third information is received.

6. The function executing device as in claim 5, wherein
in a case where a wireless network to which the terminal device currently belongs and a wireless network to which the function executing device currently belongs are identical, the process (d) includes receiving the third information from the terminal device via the first type of communication interface.

7. The function executing device as in claim 4, wherein:
in a case where the specific function is the print function, the computer-readable instructions, when executed by the one or more processors, causes the function executing device to further execute receiving second information including an execution request of the print function via the first type of communication interface after the impossibility information is sent to the terminal device, and
in a case where the second information is received:
(A) the process (c) includes executing the change process,
(B) in a case where the change process is executed, the process (d) includes executing the communication process of receiving the print data from the terminal device via the second type of communication interface, and
the process (d) includes executing the print process in accordance with the print data within the memory in a case where the state of the function executing device shifts from the error state to the non-error state after the second information is received.

8. The function executing device as in claim 7, wherein:
the second information further includes size information indicating a data size of the print data,
the computer-readable instructions, when executed by the one or more processors, causes the function executing device to further execute determining, using the size information and an amount of space of the memory, whether or not the print data is capable of being stored in the memory, and
in the case where the second information is received, the process (c) includes:

(A1) executing the change process in a case where it is determined that the data is capable of being stored in the memory; and
(A2) not executing the change process in a case where it is determined that the data is not capable of being stored in the memory.

9. The function executing device as in claim 1, wherein:
in a case where the specific function is a scan function including a scan process of generating scan data executing a scan of a document and the communication process of sending to the terminal device the scan data as the object data,
the process (b) includes determining whether the state of the function executing device is the non-error state or the error state using a state of a hardware for executing the scan function.

10. The function executing device as in claim 1, wherein a communication speed of the communication using the second type of communication interface is faster than a communication speed of the communication using the first type of communication interface.

11. The function executing device as in claim 1, wherein the state of the hardware for executing the print function includes a state that the print medium is jammed in a transport mechanism of the function executing device.

12. A function executing device comprising:
a first type of communication interface;
a second type of communication interface; and
a control unit comprising:
    a receiving unit configured to receive first information including an execution request of a specific function via the first type of communication interface, the specific function including a communication process for communicating object data with a terminal device;
    a state determining unit configured to determine, in a case where the first information is received, whether a state of the function executing device is a non-error state in which the function executing device is capable of executing the specific function or an error state in which the function executing device is not capable of executing the specific function;
    a changing unit configured to execute a change process for changing an interface for communicating with the terminal device from the first type of communication interface to the second type of communication interface in a case where the state of the function executing device is determined to be the non-error state, and not to execute the change process in a case where the state of the function executing device is determined to be the error state; and
    a function executing unit configured to execute the specific function including the communication process via the second type of communication interface in a case where the change process is being executed,
wherein in a case where the specific function is a print function including the communication process of receiving print data as the object data from the terminal device and a print process to be performed in accordance with the print data, the state determining unit determines whether the state of the function executing device is the non-error state or the error state using: a remaining amount of an expendable item for executing the print function, a remaining amount of print medium for executing the print function, a state of a hardware for executing the print function, or a combination thereof;
wherein the function executing device is configured to selectively operate in one of a plurality of states including a parent station state functioning as a parent station of a wireless network, a child station state functioning as a child station of the wireless network, and a device state different from the parent station state and the child station state, wherein the second type of communication interface is an interface for the function executing device operating either in the parent station state or the child station state to execute the communication process, and wherein, in a case where the function executing device operates in the parent station state in a specific wireless network to which the function executing device currently belongs, the change process includes an apparatus number determining process of determining whether or not a number of child station apparatuses operating in the child station state is less than a predetermined value, and the changing unit is configured to:

execute the change process continuously in a case where the number of child station apparatuses is less than the predetermined value; and not execute the change process continuously in a case where the number of child station apparatuses is equal to or more than the predetermined value.

13. The function executing device as in claim 12, wherein the state of the hardware for executing the print function includes a state that the print medium is jammed in a transport mechanism of the function executing device.

14. A function executing device comprising:
a first type of interface for executing a communication with a terminal device;
a second type of interface for executing a communication with the terminal device;
one or more processors; and
a memory that stores computer-readable instructions therein, the computer-readable instructions, when executed by the one or more processors, causing the function executing device to execute:

receiving a first information including an execution request of a specific function via the first type of interface, the specific function including a communication process for communicating object data with the terminal device;

executing a change process for changing an interface for communicating with the terminal device from the first type of interface to the second type of interface; and executing the specific function including the communication process via the second type of interface in a case where the change process is being executed, wherein:
    the function executing device is configured to selectively operate in one of a plurality of states including a parent station state functioning as a parent station of a wireless network, a child station state functioning as a child station of the wireless network, and a device state different from the parent station state and the child station state, the second type of interface is an interface for the function executing device operating either in the parent station state or the child station state to execute the communication process, in a case where the function executing device operates in the parent station state in a specific wireless network to which the function executing device currently belongs, the change process includes an apparatus number determining process of determining whether or not a number of child station apparatuses operating in the child station state is less than a predetermined value, the change process is continuously executed in a case where it is determined that the number of the child station apparatuses is less than the predetermined value, and the change process is not continuously executed in a case where it is determined that the number of the child station apparatuses is equal to or more than the predetermined value.

15. A function executing device comprising:
a first type of interface for executing a communication with a terminal device;
a second type of interface for executing a communication with the terminal device; and
a control unit comprising:

a receiving unit configured to receive first information including an execution request of a specific function via the first type of interface, the specific function including a communication process for communicating object data with the terminal device;

a changing unit configured to execute a change process for changing an interface for communication with the terminal device from the first type of interface to the second type of interface; and a function executing unit configured to execute the specific function including the communication process via the second type of interface in a case where the change process is being executed, wherein:
    the function executing device is configured to selectively operate in one of a plurality of states including a parent station state functioning as a parent station of a wireless network, a child station state functioning as a child station of the wireless network, and a device state different from the parent station state and the child station state, the second type of interface is an interface for the function executing device operating either in the parent station state or the child station state to execute the communication process, in a case where the function executing device operates in the parent station state in a specific wireless network to which the function executing device currently belongs, the change process includes an apparatus number determining process of determining whether or not a number of child station apparatuses operating in the child station state is less than a predetermined value, and the changing unit configured to:

execute the change process continuously in a case where it is determined that the number of the child station apparatuses in less than the predetermined value; and not execute the change process continuously in a case where it is determined that the number of the child station apparatuses is equal to or more than the predetermined value.

* * * * *